United States Patent
Artemiadis et al.

(10) Patent No.: US 10,712,820 B2
(45) Date of Patent: Jul. 14, 2020

(54) SYSTEMS AND METHODS FOR A HYBRID BRAIN INTERFACE FOR ROBOTIC SWARMS USING EEG SIGNALS AND AN INPUT DEVICE

(71) Applicants: Panagiotis Artemiadis, Tempe, AZ (US); Georgios Konstantinos Karavas, Tempe, AZ (US)

(72) Inventors: Panagiotis Artemiadis, Tempe, AZ (US); Georgios Konstantinos Karavas, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 16/342,764

(22) PCT Filed: Oct. 27, 2017

(86) PCT No.: PCT/US2017/058774
§ 371 (c)(1),
(2) Date: Apr. 17, 2019

(87) PCT Pub. No.: WO2018/081569
PCT Pub. Date: May 3, 2018

(65) Prior Publication Data
US 2020/0057498 A1 Feb. 20, 2020

Related U.S. Application Data

(60) Provisional application No. 62/413,756, filed on Oct. 27, 2016.

(51) Int. Cl.
*G06F 3/01* (2006.01)
*G06N 20/00* (2019.01)
(Continued)

(52) U.S. Cl.
CPC ............. *G06F 3/015* (2013.01); *B25J 9/163* (2013.01); *B25J 13/087* (2013.01);
(Continued)

(58) Field of Classification Search
CPC ........ G06F 3/015; G06N 7/005; G06N 20/00; B25J 13/00; B25J 13/087; B25J 9/163;
(Continued)

(56) References Cited

U.S. PATENT DOCUMENTS 7,403,815 B2 * 7/2008 Katz ...................... A61B 5/048
600/544
9,084,579 B2 * 7/2015 Ren ...................... G06K 9/6201
(Continued)

FOREIGN PATENT DOCUMENTS

KR      1020150104781 A     9/2015
KR      10-1571848 B1      11/2015
(Continued)

OTHER PUBLICATIONS

International Search Report and Written Opinion issued for PCT/US2017/058774 dated Feb. 20, 2018.
(Continued)

*Primary Examiner* — Chun Cao
(74) *Attorney, Agent, or Firm* — Polsinelli PC

(57) ABSTRACT

A system and a method for hybrid brain computer interface for controlling a robotic swarm are disclosed. The system comprises: a control interface for defining a plurality of electrodes configured for accessing a plurality of brain signals associated with a plurality of channels located over a sensorimotor cortex; a processor, in operative communication with the control interface, configured to: train a machine learning model to associate a brain state with data defining a brain signal, decode a control signal of the plurality of brain signals to generate control data, apply the
(Continued)

control data to the machine learning model to identify the brain state, and transmit instructions to a plurality of robotic devices to modify a density of the plurality of robotic devices based on the brain state; and an input device, in operable communication with the processor, for generating input data, the input data utilized by the processor to modify a position of the plurality of robotic devices.

19 Claims, 19 Drawing Sheets

(51) Int. Cl.
    *B25J 9/16*     (2006.01)
    *B25J 13/08*     (2006.01)
    *G06K 9/62*     (2006.01)
    *G06N 7/00*     (2006.01)
(52) U.S. Cl.
    CPC ......... *G06K 9/6247* (2013.01); *G06K 9/6272* (2013.01); *G06K 9/6288* (2013.01); *G06N 7/005* (2013.01); *G06N 20/00* (2019.01)
(58) Field of Classification Search
    CPC ... G06K 9/6247; G06K 9/6272; G06K 9/6288
    See application file for complete search history.

(56) References Cited

U.S. PATENT DOCUMENTS

| | | | |
|---|---|---|---|
| 9,974,344 B2* | 5/2018 | Guez | A61B 5/0476 |
| 9,992,038 B2 | 6/2018 | Youngbull et al. | |
| 10,610,099 B2 | 4/2020 | Artemiadis et al. | |
| 10,642,285 B2 | 5/2020 | Artemiadis et al. | |
| 2005/0159668 A1* | 7/2005 | Kemere | A61B 5/16 |
| | | | 600/544 |
| 2008/0177197 A1 | 7/2008 | Lee et al. | |
| 2009/0221928 A1* | 9/2009 | Einav | A61B 5/0484 |
| | | | 600/544 |
| 2013/0096453 A1* | 4/2013 | Chung | G06F 3/04847 |
| | | | 600/544 |
| 2014/0200432 A1* | 7/2014 | Banerji | A61B 5/165 |
| | | | 600/383 |
| 2014/0330396 A1* | 11/2014 | Chang | A61B 5/02416 |
| | | | 700/11 |
| 2017/0061828 A1 | 3/2017 | Artemiadis et al. | |
| 2019/0217465 A1 | 7/2019 | Artemiadis et al. | |

FOREIGN PATENT DOCUMENTS

| | | |
|---|---|---|
| WO | 2016/076886 A1 | 5/2016 |
| WO | 2016076886 A1 | 5/2016 |
| WO | 2018022692 A1 | 2/2018 |

OTHER PUBLICATIONS

Cheung et al, "Simultaneous Brain-Computer Interfacing and Motor Control: Expanding the Reach of Non-Invasive BCIs". 34th Annual International Conference of the IEEE EMBS, Aug. 28-Sep. 1, 2012, 6715-6718, San Diego, CA, USA.
Xue et al., "Design of Internet-Based Teleoperation Platform with Brian-Computer Interface." International Conference on Robotics and Biomimetics, Dec. 19-23, 2009, 723-728, Guilin, China.
Patent Cooperation Treaty, International Searching Authority, International Preliminary Report on Patentability for PCT/US2017/058774, 8 pages, report issued Apr. 30, 2019, opinion dated Feb. 20, 2018.
Patent Cooperation Treaty, International Searching Authority, International Search Report for PCT/US2017/058774, 6 pages, dated Feb. 20, 2018.

Pfurtscheller, G. et al., "Event-related EEG/MEG synchronization and desynchronization: basic principles", Clinical Neurophysiology, Nov. 1999 [available online Oct. 1999], vol. 110, No. 11, pp. 1842-1857 <DOI:10.1016/S1388-2457(99)00141-8>.
Pfurtscheller, G. et al., "The hybrid BCI", Frontiers in Neuroscience, Apr. 2010, vol. 4, article 30, 11 pages <DOI:10.3389/fnpro.2010.00003>.
Pollini, L. et al., "Human-Swarm Interface for abstraction based control", Proceedings of the 2009 AIAA Guidance, Navigation, and Control Conference (Chicago, Illinois, Aug. 10-13, 2009), 2009 pp. 1-10 <DOI:10.2514/6.2009-5652>.
Rabiner, L. et al., "An introduction to hidden Markov models", IEEE ASSp Magazine, Jan. 1986, pp. 4-16.
Rabiner, L., "A tutorial on hidden Markov models and selected applications in speech recognition", Proceedings of the IEEE, Feb. 1989, vol. 77, No. 2, pp. 257-286 <DOI:10.1109/5.18626>.
Rousseeuw, P., "Silhouettes: A graphical aid to the interpretation and validation of cluster analysis", Journal of Computational and Applied Mathematics, Nov. 1987 (available online Apr. 2002), vol. 20, pp. 53-65 <DOI:10.1016/0377-0427(87)90125-7>.
Royer, A. et al., "EEG Control of a Virtual Helicopter in 3-Dimensional Space Using Intelligent Control Strategies", IEEE Transactions on Neural Systems and Rehabilitation Engineering, Dec. 2010 (date of publication: Sep. 2010), vol. 18, No. 6, pp. 581-589 <DOI:10.1109/TNSRE.2010.2077654>.
Sassoon, L., "US Army helps develops drones that can be flown using mind control" [online], Mirror, Jul. 2016 [retrieved on Nov. 22, 2019], retrieved from the internet <URL:https://www.mirror.co.uk/tech/army-helps-develops-drones-can-8452189>.
Science Daily, "Using wireless interface, operators control multiple drones by thinking of various tasks" [online], ScienceDaily, Jul. 2016 [retrieved on Nov. 22, 2019], retrieved on the internet <URL:https://www.sciencedaily.com/releases/2016/07/160713143744.htm>.
Seckel, S., "Using wireless interface, operators control multiple drones by thinking of various tasks" [online], Asunow, Jul. 2016 [retrieved on Nov. 22, 20192], retrieved from the internet <URL:https://asunow.asu.edu/20160710-discoveries-asu-researcher-creates-system-control-robots-brain>.
Staahl, D., "ASU researcher controls multiple drones with his mind" [online], AZFamily, Jul. 2016 [retrieved on Nov. 22, 2019], retrieved from the internet: <URL:https://www.azfamily.com/archives/asu-researcher-controls-multiple-drones-with-his-mind/article_7ec5c97b-f643-52c1-8b92-e6f65abf30bb.html>.
Stoica, A. et al., "Towards human-friendly efficient control of multi-robot teams", Proceedings of the 2013 International Conference on Collaboration Technologies and Systems (San Diego, California, May 2013), 2013 [Date added to IEEE Xplore: Jul. 2013], pp. 226-231 <DOI: 10.1109/CTS.2013.6567233>.
Thompson, L., "Soon, You'll Control Swarms of Drones With Your Mind" [online], Nerdist, Jul. 2016 [retrieved on Nov. 22, 2019], retrieved from the internet <URL:https://archive.nerdist.com/soon-youll-control-swarms-of-drones-with-your-mind/?list=related>.
Tousigant, L., "The military will soon control swarms of drones with their minds" [online], New York Post, Jul. 2016 [retrieved on Nov. 22, 2019], retrieved from the internet <URL:https://nypost.com/2016/07/13/the-military-will-soon-control-swarms-of-drones-with-their-minds/>.
Wolpaw, J. et al., "Control of a two-dimensional movement signal by a noninvasive brain-computer interface in humans", Proceedings of the National Academy of Sciences of the United States of America, Dec. 2004, vol. 101, No. 51, pp. 17849-17854 <DOI:10.1073/pnas.0403504101>.
Wolpaw, J. et al., "Electroencephalographic (EEG) control of three-dimensional movement", Journal of Neural Engineering, May 2010, vol. 7, No. 3, article 036007, 9 pages <DOI:10.1088/1741-2560/7/3/036007>.
WWMT, "Researches create mind controlled drone device" [online], WMMT West Michigan, Jul. 2016 [retrieved on May 13, 2020], retrieved from the internet <URL:https://wwmt.com/news/offbeat/researches-create-mind-controlled-drone-device>.
Xu, L. et al., "On Convergence Properties of the EM Algorithm for Gaussian Mixtures", Neural Computation, Jan. 1996, vol. 8, No. 1, pp. 129-151 <DOI:10.1162/neco.1996.8.1.129>.

(56) References Cited

OTHER PUBLICATIONS

Xue, K. et al., "Design of Internet-based teleoperation platform with Brain-Computer Interface", IEEE International Conference on Robotics and Biomimetics (Guilin, China, Dec. 19-23, 2009), 2010 (date added to IEEE Xplore: Feb. 2010), pp. 723-728 <DOI:10.1109/ROBIO.2009.5420583>.

Alexander, M., "Arizona State University finds a way to control drones using brainwaves" [online], Memburn, Jul. 2016 [retrieved on Nov. 22, 2019], retrieved from the internet <URL:https://memeburn.com/2016/07/arizona-state-university-drones-brainwaves/>.

Alvarez, R., "With this interface, one person can control a swarm of drones with their mind" [online], The Science Explorer, Jul. 2016 [retrieved on Nov. 22, 2019], retrieved from the internet <URL:http://thescienceexplorer.com/technology/interface-one-person-can-control-swarm-drones-their-mind>.

Amiri, S. et al., "A Review of Hybrid Brain-Computer Interface Systems", Advances in Human-Computer Interaction, 2013, vol. 2013, article 187024, 8 pages <DOI:10.1155/2013/187024>.

Anjy, "Scientist Controls Multiple Drones Just by Thinking" [online], TechFactsLive, Jul. 2016 [retrieved on Nov. 22, 2019], retrieved from the internet <URL:https://techfactslive.com/scientist-controls-multiple-drones-just-thinking/3687/>.

Argunsah, A. et al., "AR-PCA-HMM Approach for Sensorimotor Task Classification in EEG-based Brain-Computer Interfaces", 20th International Conference on Pattern Recognition (Istanbul, Turkey, Aug. 23-26, 2010), 2010 (date added to IEEE Xplore: Oct. 2010), pp. 113-116 <DOI:10.1109/ICPR.2010.36>.

Beall, A., "The drones that fly using Mind Control: Swarms of UAVS developed for the US military could be guided by brain waves" [online], Daily Mail, Jul. 2016 [retrieved on Nov. 22, 2019], retrieved from the internet <URL:https://www.dailymail.co.uk/sciencetech/article-3697421/Is-MIND-CONTROL-future-warfare-Swarms-drones-developed-army-guided-brain-waves.html>.

Bell, C. et al., "Control of a humanoid robot by a noninvasive brain—computer interface in humans", Journal of Neural Engineering, May 2008, vol. 5, No. 2, pp. 214-220 <DOI:10.1088/1741-2560/5/2/012>.

Birbaumer, N. et al., "The thought translation device (TTD) for completely paralyzed patients", IEEE Transactions on Rehabilitation Engineering, Jun. 2000, vol. 8, No. 2, pp. 190-193 <DOI:10.1109/86.847812>.

Burge, K., "How an ASU Professor Controls Drones Using His Mind" [online], KJZZ, Jul. 2016, updated Aug. 2016 [retrieved on Nov. 22, 2019], retrieved from the internet <URL:https://kjzz.org/content/342367/how-asu-professor-controls-drones-using-his-mind>.

Cheung, W. et al., "Simultaneous brain-computer interfacing and motor control: Expanding the reach of non-invasive BCIs", Annual International Conference of the IEEE Engineering in Medicine and Biology Society (San Diego, CA, Aug. 28-Sep. 1, 2012), 2012 (date added to IEEE Xplore: Nov. 2012), pp. 6715-6718 <DOI:10.1109/EMBC.2012.6347535>.

cnet.com, "Yeehaw! Swagbot is the world's finest robot cowboy (Tomorrow Daily 393)" [online], CNET, Jul. 2016 [retrieved on May 13, 2020, retrieved from the internet <URL:https://www.cnet.com/videos/yeehaw-swagbot-is-the-worlds-finest-robot-cowboy-tomorrow-daily-393/>.

CNN WIRE, "Arizona State researcher controls multiple drones with his mind" [online], Fox News 31, Jul. 2016 [retrieved on Nov. 22, 2019 ], retrieved from the internet <URL:https://kdvr.com/2016/07/16/arizona-state-researcher-controls-multiple-drones-with-his-mind/>.

Cole, S., "This Scientist Is Commanding a Swarm of Drones With His Mind" [online], Popular Science, Jul. 2016 [retrieved on Nov. 22, 2019], retrieved from the internet <URL:https://www.popsci.com/this-scientist-is-commanding-swarm-drones-with-his-mind/>.

Crouse, M., "ASU Researcher Controls Drone 'Swarm' with His Mind" [online], PDDNET, Jul. 2016 [retrieved on Nov. 22, 2019 from archive.org, as it appeared on Jul. 27, 2016], retrieved from the internet <URL:https://web.archive.org/web/20160727163843/https://www.pddnet.com/news/2016/07/asu-researcher-controls-drone-swarm-his-mind>.

Dempster, A. et al., "Maximum Likelihood from Incomplete Data via the EM Algorithm", Journal of the Royal Statistical Society: Series B (Methodological), 1977, vol. 39, No. 1, pp. 1-38.

Dennis, C., "Brain-Powered Drone Swarms Could Seriously Be a Thing" [online], Inverse, Jul. 2016 [retrieved on Nov. 22, 2019], retrieved from the internet <URL:https://www.inverse.com/article/18527-mind-controlled-drone-swarms-could-be-a-thing>.

DNA INDIA, "Researcher builds technology to control drone swarms with his mind" [online], DNA INDIA, Jul. 2016 [retrieved on Nov. 22, 2019], retrieved from the internet <URL:https://www.dnaindia.com/technology/report-researcher-builds-technology-to-control-drone-swarms-with-his-mind-2235398>.

Dormehl, L., "This scientist can control a swarm of drones with his thoughts" [online], Digital Trends, Jul. 2016 [retrieved on Nov. 22, 2019], retrieved from the internet <URL:https://www.digitaltrends.com/cool-tech/drone-swarm/>.

Farwell, L. et al., "Talking off the top of your head: toward a mental prosthesis utilizing event-related brain potentials", Electroencephalography and Clinical Neurophysiology, Dec. 1988, vol. 70, No. 6, pp. 510-523.

Geere, D. "How to control a bunch of drones with the power of thought alone" [online], Techredar, Jul. 2016 [retrieved on Nov. 22, 2019], retrieved from the internet <URL:https://www.techradar.com/news/world-of-tech/how-to-control-a-bunch-of-drones-with-the-power-of-thought-alone-1324880>.

Ghahramani, Z. et al., "An Introduction to Hidden Markov Models and Bayesian Networks", International Journal of Patter Recognition and Artificial Intelligence, 2001, vol. 15, No. 1, pp. 9-42 <DOI:10.1142/S0218001401000836>.

Halkidi, M. et al., "Cluster validity methods: part I", ACM SIGMOD Record, Jun. 2002, vol. 31, No. 2, pp. 40-45 <DOI:10.1145/565117.565124>.

Halkidi, M. et al., "Clustering validity checking methods: part II", ACM SIGMOD Record, Sep. 2002, vol. 31, No. 3, pp. 19-27 <DOI:10.1145/601858.601862>.

He, P. et al., "Removal of ocular artifacts from electro-encephalogram by adaptive filtering", Medical and Biological Engineering and Computing, May 2004, vol. 42, No. 3, pp. 407-412 <DOI:10.1007/BF02344717>.

He, P. et al., "Removal of ocular artifacts from the EEG: a comparison between time-domain regression method and adaptive filtering method using simulated data", Medical and Biological Engineering and Computing, May 2007 (available online Mar. 2007), vol. 45. No. 5, pp. 495-503 <DOI:10.1007/s11517-007-0179-9>.

Herrmann, C., "Human EEG responses to 1-100 Hz flicker: resonance phenomena in visual cortex and their potential correlation to cognitive phenomena", Experimental Brain Research, Apr. 2001 (available online Mar. 2001), vol. 137, No. 3-4, pp. 346-353 <DOI:10.1007/s002210100682>.

Holsheimer, J. et al., "Volume conduction and EEG measurements within the brain: a quantitative approach to the influence of electrical spread on the linear relationship of activity measured at different locations", Electroencephalography and Clinical Neurophysiology, Jul. 1977, vol. 43, No. 1, pp. 52-58.

Karavas, G. et al., "A hybrid BMI for control of robotic swarms: Preliminary results", 2017 IEEE/RSJ International Conference on Intelligent Robots and Systems (IROS) (Vancouver, BC, Canada, Sep. 24-28, 2017), [Date Added to IEEE Xplore: Dec. 2017], pp. 5065-5070 <DOI: 10.1109/IROS.2017.8206390>.

Karavas, G. et al., "On the effect of swarm collective behavior on human perception: Towards brain-swarm interfaces", IEEE International Conference on Multisensor Fusion and Integration for Intelligent Systems (San Diego, California, Sep. 14-16, 2015), 2015 [Date Added to IEEE Xplore: Oct. 2015) pp. 172-177 <DOI:10.1109/MFI.2015.7295804>.

Klem, G. et al., "The ten-twenty electrode system of the International Federation", Recommendations for the Practice of Clinical Neurophysiology: Guidelines of the International Federation of Clinical Physiology, 1999, vol. 52, pp. 3-6.

(56) References Cited

OTHER PUBLICATIONS

Kullman, J., "Brain control: Taking human-technology interaction to the next level" [online], ASU SEMTE, Apr. 2014 [retrieved on Nov. 22, 2019 from archive.org, as it appeared on Sep. 6, 2015], retrieved from the internet <URL:https://web.archive.org/web/20150906061222/http://semte.engineering.asu.edu/news/brain-control-taking-human-technology-interaction-next-level/>.

Kullman, J., "Fortifying national defense with robot swarms, resilient materials" [online], ASU SEMTE, Jan. 2015 [retrieved on Nov. 22, 2019 from archive.org as it appeared on Mar. 9, 2015], retrieved from the internet <URL:https://web.archive.org/web/20150309064407/http://semte.engineering.asu.edu/news/fortifying-national-defense-robot-swarms-resilient-materials/>.

Lafleur, K. et al., "Quadcopter control in three-dimensional space using a noninvasive motor imagery-based brain-computer interface", Journal of Neural Engineering, Aug. 2013 [available online Jun. 2013], vol. 10, No. 4, article 046003, 15 pages <DOI: 10.1088/1741-2560/10/4/046003>.

Lee, H. et al., "PCA+HMM+SVM for EEG pattern classification", Proceedings of the 7th International Symposium on Signal Processing and Its Applications (Paris, France, Jul. 4, 2003), 2003 (date added to IEEE Xplore: Aug. 2003), pp. 541-544 <DOI:10.1109/ISSPA.2003.1224760>.

Leeb, R. et al., "A hybrid brain-computer interface based on the fusion of electroencephalographic and electromyographic activities", Journal of Neural Engineering, Mar. 2011, vol. 8, No. 2, article 025011, 5 pages<DOI:10.1088/1741-2560/8/2/025011>.

Li, Y. et al., "An EEG-Based BCI System for 2-D Cursor Control by Combining Mu/Beta Rhythm and P300 Potential", IEEE Transactions on Biomedical Engineering, Oct. 2010 [IEEE Date of Publication: Jul. 2010], vol. 57, No. 10, pp. 2495-2505 <DOI:10.1109/TBME.2010.2055564>.

Lotte, F. et al., "A review of classification algorithms for EEG-based brain-computer interfaces", Journal of Neural Engineering, Jun. 2007, [available online Jan. 2007], vol. 4, No. 2, pp. R1-R13 <DOI:10.1088/1741-2560/4/2/R01>.

Ma, J. et al., "A novel EOG/EEG hybrid human-machine interface adopting eye movements and ERPs: Application to robot control", IEEE Transactions on Biomedical Engineering, Mar. 2015 [IEEE Date of Publication: Nov. 2014], vol. 62, No. 3, pp. 876-879 <DOI:10.1109/TBME.2014.2369483>.

Mahoney, E., "ASU professor strives to develop military vehicles controlled by thought", The State Press, May 2014 [retrieved on Nov. 22, 2019], retrieved from the internet <URL:https://www.statepress.com/article/2014/05/asu-professor-strives-to-develop-military-vehicles-controlled-by-thought/>.

McFarland, D. et al., "Electroencephalographic (EEG) control of three-dimensional movement", Journal of Neural Engineering, May 2010, vol. 7, No. 3, article 036007, 9 pages <DOI:10.1088/1741-2560/7/3/036007>.

McFarland, D. et al., "Spatial filter selection for EEG-based communication", Electroencephalography and Clinical Neurophysiology, Sep. 1997 [available online Sep. 1999], vol. 103, No. 3, pp. 386-394 <DOI:10.1016/S0013-4694(97)00022-2>.

McLurkin, J. et al., "Speaking swarmish: Human-robot interface design for large swarms of autonomous mobile robots", Proceedings of AAAI Spring Symposium (Stanford, California, Mar. 27-29, 2006), Jan. 2006, vol. 100, No. 3, pp. 72-75.

Mellinger, D. et al., "Trajectory generation and control for precise aggressive maneuvers with quadrotors", The International Journal of Robotics Research, Apr. 2012 (available online Jan. 2012), vol. 31, No. 5, pp. 664-674 <DOI:10.1177/0278364911434236>.

Millan, J. et al., "Combining brain-computer interfaces and assistive technologies: state-of-the-art and challenges", Frontiers in Neuroscience, Sep. 2010, vol. 4, article 161, 15 pages <DOI:10.3389/fnins.2010.00161>.

Millan, J. et al., "Noninvasive brain-actuated control of a mobile robot by human EEG", IEEE Transactions on Biomedical Engineering, Jun. 2004 [IEEE Date of Publication: May 2004], vol. 51, No. 6, pp. 1026-1033 <DOI:10.1109/TBME.2004.827086>.

Muller-Putz, G. et al., "EEG-based neuroprosthesis control: A step towards clinical practice", Neuroscience Letters, Jul. 2005 [available online Apr. 2005], vol. 382, pp. 169-174 <DOI:10.1016/J.NEULET.2005.03.021>.

Nagi, J. et al., "Human-swarm Interaction Using Spatial Gestures", 2014 IEEE/RSJ International Conference on Intelligent Robots and Systems (Chicago, IL, USA, Sep. 14-18, 2014), 2014 (Date Added to IEEE Xplore: Nov. 2014), pp. 3834-3841 <DOI:10.1109/IROS.2014.6943101>.

Neuper, C. et al., "Event-related dynamics of cortical rhythms: frequency-specific features and functional correlates", International Journal of Psychophysiology, Dec. 2001, vol. 43, No. 1, pp. 41-58 <DOI:10.1016/S0167-8760(01)00178-7>.

Obermaier, B. et al., "Hidden Markov models for online classification of single trial EEG data", Pattern Recognition Letters, Oct. 2001 (available online Jul. 2001), vol. 22, No. 12, pp. 1299-1309 <DOI:10.1016/S0167-8655(01)00075-7>.

Overly, S., "Meet the man who controls drones with his mind" [online], The Washington Post, Jul. 2016 [retrieved on Nov. 22, 2019], retrieved from the internet: <URL:https://www.washingtonpost.com/news/innovations/wp/2016/07/12/this-lab-is-developing-drones-you-control-with-your-mind/>.

X. D. Huang, Y. Ariki, and M. Jack, Hidden Markov models for speech recognition. Edinburgh University Press, 1990.

John Wiley & Sons Inc., 1975. J. A. Hartigan, Clustering algorithms.

I. T. Jolliffe, Principal Components Analysis., 2nd ed. Springer, 2002.

G. J. McLachlan, Finite Mixture Models. Wiley, 2000.

Prentice Hall Signal Processing Series, 1993.

L. Rabiner and B.-H. Juang, Fundamental of speech recognition.

Mind Drones, ASU Now, 2016, https://vimeo.com/173548439.

Formation Control of Robotic Swarms Using Brain Interface, HORC ASU, May 13, 2016. https://www.youtube.com/watch?v=BymnXeuSLcY.

\* cited by examiner

SYSTEMS AND METHODS FOR A HYBRID BRAIN INTERFACE FOR ROBOTIC SWARMS USING EEG SIGNALS AND AN INPUT DEVICE

CROSS REFERENCE TO RELATED APPLICATIONS

This is a non-provisional application that claims benefit to U.S. provisional application Ser. No. 62/413,756, filed on Oct. 27, 2016, which is herein incorporated by reference in its entirety.

GOVERNMENT SUPPORT

This invention was made with government support under FA9550-14-1-0149 awarded by the Air Force Office of Scientific Research and under D14AP00068 awarded by the Defense Advanced Research Projects Agency. The government has certain rights in the invention.

FIELD

The present disclosure generally relates to a hybrid brain computer interface and in particular to a hybrid brain computer interface for controlling a robotic swarm.

BACKGROUND

Brain Computer Interfaces (BCI) have gained increased attention over the last decades because they offer intuitive control in a plethora of applications where other interfaces (e.g. joysticks) are inadequate or impractical. Moreover, these kinds of interfaces allow people with motor disabilities due to amyotrophic lateral sclerosis (ALS), spinal cord injuries (SCI) etc. to interact with the world. This interaction is found in many forms and can vary between controlling the motion of a cursor on a screen to interacting with an actual robotic platform. However, most of the existing systems allow only binary control, while the number of degrees of freedom directly controlled through those interfaces is quite limited, i.e. only one or two in most cases.

There are many types of BCIs and each one of them exploits different functions of the human brain. Most of them rely on the analysis of ElectroEncephaloGraphic (EEG) signals and their features, such as: P300 Event Related Potentials (ERP), Slow Cortical Potentials (SCP), Steady State Visual Evoked Potentials (SSVEP) or Event Related Desynchronization/Synchronization (ERD/ERS) phenomena.

One very popular type of brain-machine interaction is the control of a cursor's 2D position on a screen. This involves the control of brain activity at specific frequency bands chosen appropriately for each user. The advantage of this approach is that the output of the BCIs comprises continuous variables that affect the velocity of the cursor at different directions, thus controlling multiple degrees of freedom (DOFs) at once. However, this approach involves lengthy training sessions until the users can achieve an acceptable level of control.

Many researchers have successfully applied methodologies that output discrete decisions for controlling a robotic platform. These decisions represent the high-level planner for the robot, while the on-board sensors take care of the low-level control, such as obstacle avoidance. One such example is where the user transitions from one brain state to another in order to move a mobile robot through a maze-like environment that avoids collisions based on its onboard sensing. Another example is the use of SSVEP in order to specify objects of interest for the subject and control a robot to move these objects from one place to another as specified by the user. Many of those methodologies rely on different machine learning techniques in order to properly differentiate between different brain states and, thus, correctly identify the users' intent. The advantage of such an approach is that it leads to the extraction of robust features that can be automatically detected for each subject without requiring lengthy training sessions. This results in systems that are highly customizable, more robust and easier to use. However, this comes at the expense of less DOFs because there are certain restrictions on the amount of brain states that such algorithms can detect and discriminate.

In order to address the issues of the previous approaches, many researchers have proposed various hybrid BCI systems. There are two categories of such systems. The first one refers to methods that combine simultaneously or sequentially two different types of EEG signals, as for example where ERD/ERS based signals are combined with P300 potentials. The second category involves systems that combine EEG signals with different types of biosignals such as electromyograms (EMG), electrooculo-grams (EOG), or with assistive technologies (AT), such as wheelchairs, mice or keyboards, i.e. non-biological signals. The goal of both of such systems is either to enhance the accuracy of the brain state classification or provide a type of "brain switch" that can help users complete more complicated tasks. The problem with such systems, especially when multiple EEG modalities are involved, is that there is high complexity, due to the fact that the user has to switch among different interfaces, while in some cases considerable cross-talk across multiple interfaces makes the robustness of the systems questionable.

BRIEF DESCRIPTION OF THE DRAWINGS

Corresponding reference characters indicate corresponding elements among the view of the drawings. The headings used in the figures do not limit the scope of the claims.

DETAILED DESCRIPTION

In this disclosure, a hybrid BCI system is disclosed which combines EEG signals and joystick input. The resulting system has proven to be robust across multiple subjects and can even be used for real-time control of robots. The simultaneous use of a joystick increases the number of degrees of freedom controlled by the users, which enables more dexterous and complicated control strategies for robotic systems, while remaining intuitive for the user. With regard to the brain signals, the system exploits the ERD/ERS phenomena that takes place during limb movement imagination by combining Principal Component Analysis (PCA) with Hidden Markov Models (HMMs). The latter is especially useful in EEG research, although not used enough in the past, because of the dynamic nature of the brain signals and their non-stationarity. The resulting system is easy to use and requires minimum training. Results are presented that prove the feasibility of the platform for multiple subjects. In addition, this methodology is applied to the control of a swarm of quadrotors proving both the system's capability for control of actual robotic platforms and the feasibility of controlling the behavior of a swarm of robots using EEG signals. In particular, the swarm density is controlled using the brain recordings.

Experimental Procedure

In order to assess the performance of our hybrid BCI and prove its viability for controlling a swarm of quadrotors, two separate experiments were performed. The first one involved several different subjects that interacted with a two-dimensional interface on a computer monitor, while the second one involved one of the subjects controlling a team of three quadrotors. Specifically, in the second experiment the user was controlling the distance between the agents, i.e. the density of the swarm, and its elevation.

Figure 1:
FIG. 1 is a picture showing a subject wearing a cap with EEG electrodes looking at a monitor which shows a task that the subject must execute, according to aspects of the present disclosure.

In the first experiment, the subjects (five right-handed males between the ages of 22 and 27) were asked to control the position and size of a two-dimensional object in a virtual environment shown to them on a monitor. The experimental setup is shown in FIG. 1. The experimental protocol is approved by the ASU IRB (Protocols: 1309009601, STUDY00001345).

The experiment consisted of three (3) phases. The first phase (data collection phase) involved EEG data collection for training of the machine learning algorithm that would recognize the brain states of the users, and for calculating other useful parameters related to the control of the system. The second phase (training phase) was related to the training of the machine learning models themselves and could be broken into two parts, namely the model order selection and the model parameter estimation. The final phase (control phase) involved the control of the two-dimensional virtual interface, as mentioned previously.

Figure 2:
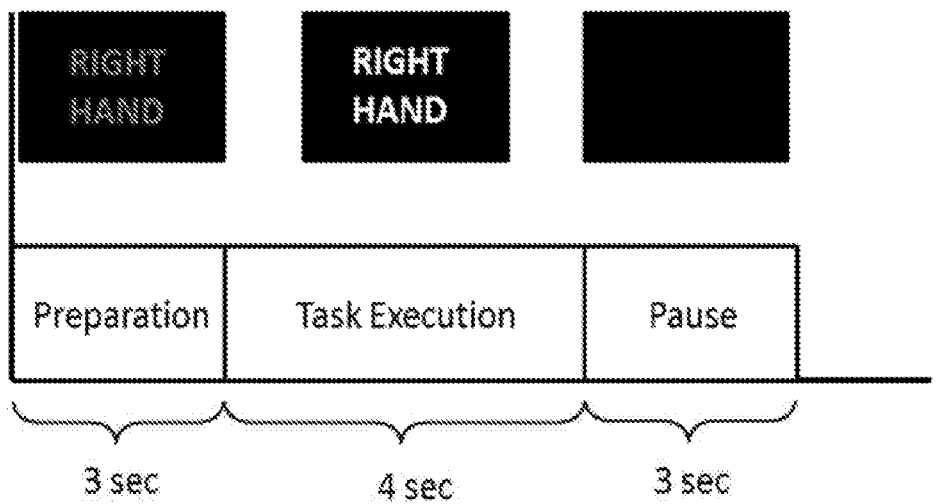
FIG. 2 is a simplified diagram showing that each trial during the initial data collection phase includes a preparation period, a main trial where the subject performs a task, and a pause period, according to aspects of the present disclosure.

During the data collection phase, the subjects were instructed to remain calm and relax their muscles, try to stay still and stare at a computer monitor in front of them which provided instructions. They were also given a game controller to hold with their right hand. At the beginning of each trial, a text message appeared on the screen with instructions about the desired task. The text messages were "Right Hand", "Left Hand" and "Rest". In the first case, the subjects were asked to randomly move the right joystick of the controller using their right hand. In the second case, they had to imagine the kinesthetic sensation of closing their left hand to a fist, while in the last case, they were instructed to remain still and focus on their breathing or their nose. At each trial, the text appeared at first in red color for 3 seconds to prepare the subjects for the task, then it became white for 4 seconds in order to inform them to execute the corresponding action repeatedly over that period of time and after that there was a pause of 3 seconds followed by the next trial. The subjects were instructed to initiate the corresponding task as soon the text on the screen changed from red to white. Each subject completed 20 trials per each task, i.e. 60 trials in total, randomized between the three different tasks. During each trial, the subjects were instructed to avoid eye blinks as much as possible. The initial preparation and the pause time allowed for some eye blinking, helping the subjects to stay comfortable throughout this phase. The procedure is also depicted in FIG. 2.

During the training phase, the data recorded during the previous step were passed through an algorithm to detect the frequencies where the ERD/ERS phenomena were more distinct. The same data were also used to train the models that would classify the corresponding brain states and to compute their model order (i.e. number of parameters etc.). More details about this procedure are given further below.

Figure 3:
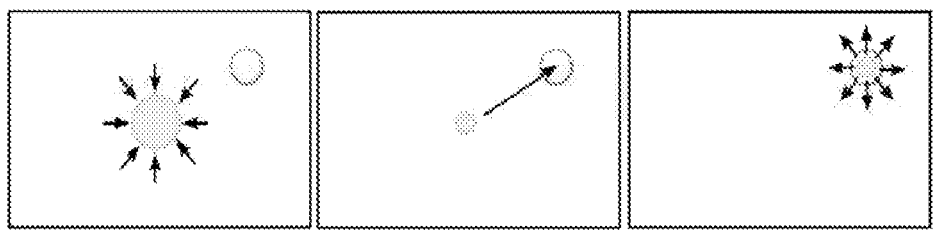
FIG. 3 is an illustration showing the control phase where the subject performs a task, according to aspects of the present disclosure.

During the control phase, the subjects had to move a solid circle from an initial position at the center of the screen to a randomly placed target depicted as a hollow target circle as shown in FIG. 3. Before that, they had to change its size using EEG activations in order to fit the solid circle inside the target circle which was always of smaller size. Once the solid circle was inside the target circle, the subjects had to enlarge it to match the size of the target. The latter was controlled by their brain activations. Once the solid circle fit the target circle in size, the trial was deemed successful and the next trial began after a 5-second pause. Each subject completed two sessions of 40 trials each (80 trials in total), with a 10-20 minutes pause in between. In each trial, the users had to complete the task in 60 seconds. If they could not, the trial was deemed unsuccessful and they proceeded to the next one. Each of the 40 trials was different and randomized both with respect to the position and size of the target circle, as well as the size of the solid circle. The same trials were repeated for the second session in the same order as in the first in order to detect any improvements on the usage of the system between the two sessions and to provide more training time to the subjects to learn to control their brain activity.

The second experiment comprised the same three phases as the first one, namely a data collection phase, a model training phase and a control phase. The first two phases were identical to the first experiment. The difference lay in the control phase and its goal, where the subject had to control a swarm of three medium-size quadrotors instead of a circle on a virtual interface. In more detail, the subject had to change the distance between the quadrotors, pass them through a rectangular hoop and then change the quadrotor distance back to its original value. The position of the swarm was controlled using input from the joystick, while the swarm density was controlled by brain signals.

Data Acquisition and Signal Conditioning

The EEG signals were recorded using the Brain Products ActiCHamp amplifier system using 64 electrodes placed according to the 10/20 International system. The data were recorded at 500 Hz. A 5th order Butterworth band-pass filter between the frequencies of 1 and 40 Hz was applied to the data in order to remove low-frequency trends and line noise. In order to accommodate for the volume conduction effects that are typical in scalp EEG measurements, a large Laplacian filter was applied to each of the channels of interest. The filter was applied based on its difference approximation, where for each channel the mean of its neighbors was subtracted from the original signal. The large Laplacian filter was chosen for its superior capabilities over other spatial filtering processes and its low computational cost when applied in its difference approximation form, which is critical for on-line applications.

Figure 4:
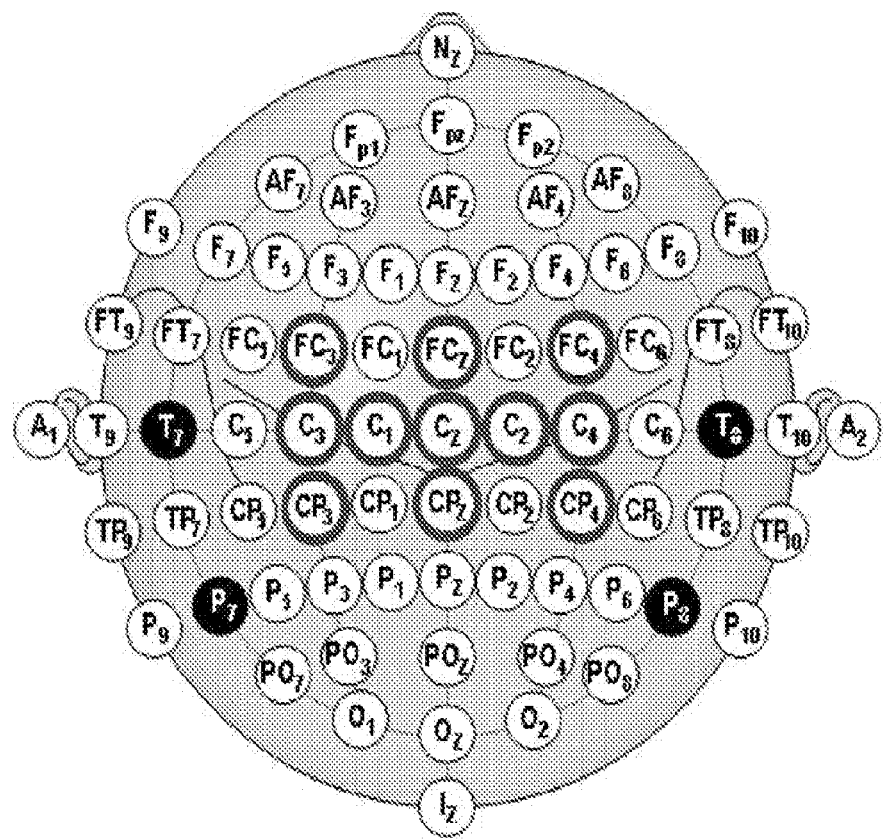
FIG. 4 is a simplified illustration showing the channels chosen for the analysis of the EEG signals circled in red, according to aspects of the present disclosure.

This disclosure focuses on 11 channels located over the sensorimotor cortex, namely C3, Cz, C4, FC3, CP3, C1, FCz, CPz, C2, FC4, and CP4 (shown in FIG. 4). The same preprocessing procedure was followed both during the off-line analysis in the training phase and during the on-line processing for the control phase. The only difference was that in the control phase a separate electrooculogram (EOG) artifact removal algorithm was applied before the large Laplacian referencing in order to eliminate any artifacts from eye blinks and eye movements.

Feature Extraction

After the preprocessing step, a Fast Fourier Transform (FFT) was applied to the data in order to extract the spectral features of the signals. More precisely, a FFT was applied to a window of 256 datapoints sliding every 25 datapoints (or 50 ms) after a Hanning window of the same length was applied to the data.

Figure 5A:
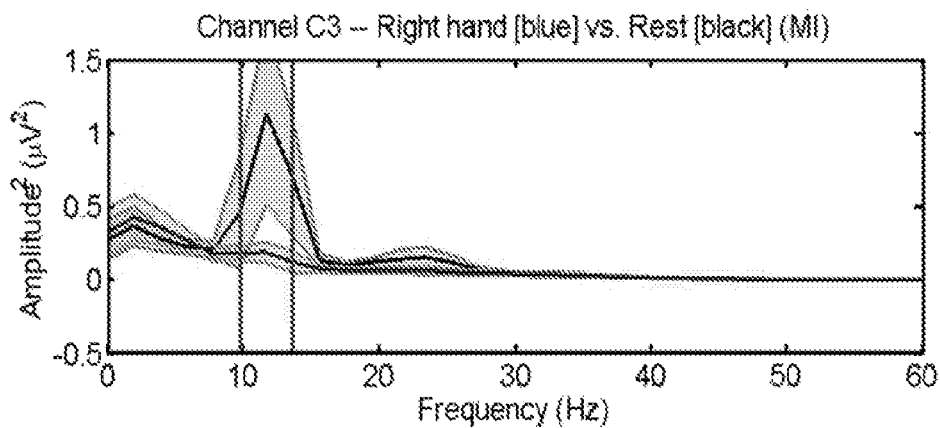
FIGS. 5A and 5B are graphs showing the frequency band detection for Subject S4 and channel C3, according to aspects of the present disclosure.
Figure 5B:
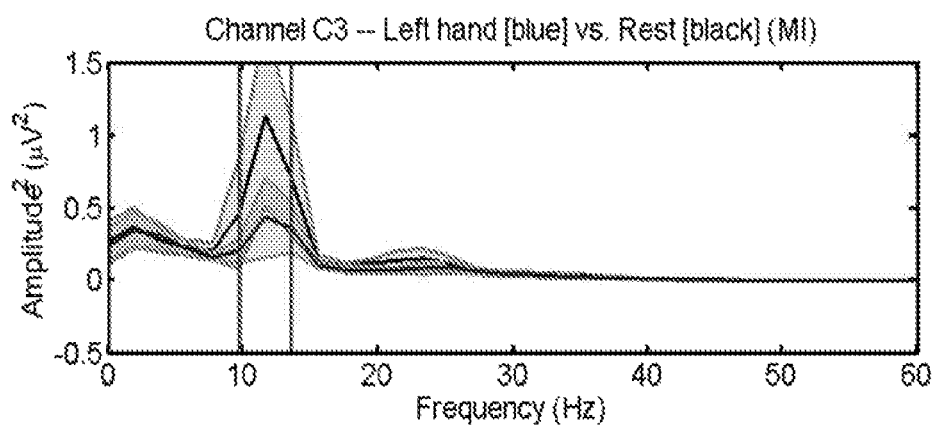
Figure 6:
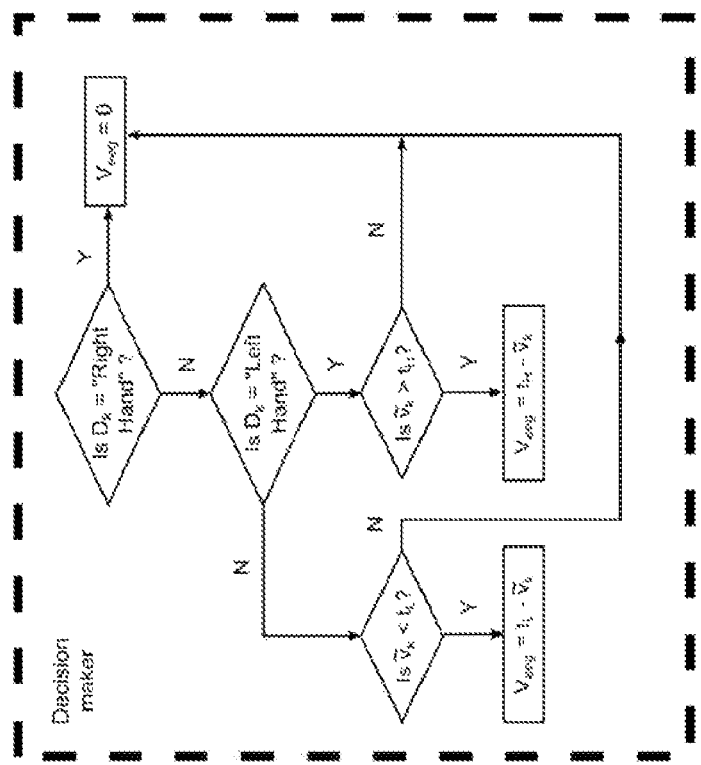
FIG. 6 is a simplified diagram showing the procedure for computing the signal Veeg that is used in the control phase, according to aspects of the present disclosure.
Figure 6:
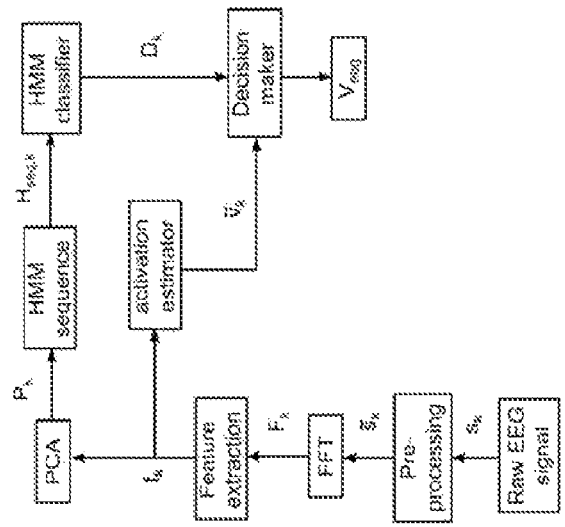

For each channel, a dedicated algorithm selected automatically a frequency band of interest (see example in FIG. 5). Its goal was to find for each channel the frequency band that the user was activating the most. This disclosure focuses in ERD/ERS phenomena on the motor cortex while the subjects were performing limb movement imagination or actual limb movement (joystick movement) and we focused our search on the alpha (a) and beta 03) bands, namely on the frequencies between 7 and 30 Hz. More specifically, the algorithm was looking for reduction of the FFT spectrum with respect to the "Rest" state in the alpha (a) band and/or an increase of the spectrum in the beta 03) band. In order to do that, the algorithm calculated the mean of the FFT coefficients over time for each trial (20 per task) and then the grand mean for all trials that corresponded to the same brain state/task. Then, the "Right Hand" and "Left Hand" tasks were compared to the "Rest" task in order to identify the frequencies at each channel in which the highest deviation from the "Rest" task occurred. The frequency coefficients of interest included the coefficient with the highest deviation and the coefficients before and after that as illustrated in the example of FIG. 5.

In order to further extract features that would guarantee good differentiation among the tasks, we applied the Principal Component Analysis (PCA) to the final FFT features. More specifically, all the FFT features were collected for all three tasks ("Right Hand", "Left Hand", "Rest") and we selected those Principal Components (PCs) that would describe 90% or above of the data variance. This resulted in 4 to 5 components for each subject. Finally, these components were used as our final features which were collected in data sequences that would be later used for the training of the machine learning models.

Hidden Markov Models (HMM) methodology

In order to classify the brain states of the users, Hidden Markov Models (HMMs) were used. The HMMs method was originally developed for speech recognition applications, but has been used by some researchers for EEG signals as well due to their similarities with speech signals in terms of non-stationarity and periodicities. In these works, the HMM methodology was combined with feature extraction techniques such as autoregressive (AR) modeling and PCA and in tandem to other classification methods such as Support Vector Machines (SVM). In the present disclosure, HMMs with PCA were combined in order to distinguish between more descriptive features and at the same time take into account the dynamic nature and non-stationarity of the EEG signals.

A brief description of the HMM methods is given below in order to show the application of the method to the problem. An HMM is a tool to describe stochastic processes. More precisely, it represents probability distributions over sequences of observations that are emitted from the underlying process. Let $Y_t$ denote an observation at time t. It can be a discrete symbol (e.g. a letter of the alphabet) or a continuous value (e.g. EEG signals). The hidden Markov model assumes that (a) the observation at time t was generated by a state $S_t$ of the system that is hidden to the outside observer, and that (b) the state $S_t$ satisfies the Markov property, i.e. that given the value of $S_{t-1}$, the state $S_t$ is independent of all the states prior to t−1. The observations $Y_t$ also satisfy the Markov property in that given $S_t$, $Y_t$ is independent from the states and observations at all other times. The assumption about the state and the observations satisfying the Markov property can be mathematically written as follows:

$$P(S_t|S_{t-1}, S_{t-2}, \ldots, S_1) = P(S_t|S_{t-1})$$

$$P(Y_t|S_t, S_{t-1}, \ldots, S_1, Y_{t-1}, \ldots, Y_1) = P(Y_t|S_t) \quad (1)$$

This leads to the following expression of the joint distribution of a sequence of states and observations:

$$P(S_{1:T}, Y_{1:T}) = P(S_1)P(Y_1 \mid S_1) \prod_{t=2}^{T} P(S_t \mid S_{t-1}) P(Y_t \mid S_t) \quad (2)$$

where $S_{1:T}$ means $S_1, \ldots, S_T$ (similarly for $Y_{1:T}$) and T is the length of the sequence.

In order to define an HMM, a probability distribution is needed over the initial state $P(S_1)$ of the system (also denoted as $\pi$) as well as a state transition matrix A that describes the probabilities of transitioning from one state to the other $P(S_t \mid S_{t-1})$, and the observation probabilities given the state $P(Y_t \mid S_t)$, which are usually denoted by the letter B. Thus, an HMM can be described as $\lambda = (A, B, \pi)$. In an HMM framework, it is assumed that all the probabilities are not dependent on t (except for the initial state) and thus, that the system is time-invariant. If the observations are discrete symbols, then the probabilities $P(Y_t \mid S_t)$ can be described by an K×L observation or emission matrix, where K is the number of possible states and L is the number of possible observation values. In the case that the observations correspond to continuous values, the probabilities $P(Y_t \mid S_t)$ can be modeled as a Gaussian, mixtures of Gaussians or a neural network.

The HMM methodology can give solutions to three kinds of problems:
  Given the model $\lambda = (A, B, \pi)$ and a sequence of observations $Y_{1:T}$, compute $P(Y_{1:T} \mid \lambda)$, i.e. find the likelihood of the sequence of observations given the model.
  Given the model $\lambda = (A, B, \pi)$ and a sequence of observations $Y_{1:T}$, find an optimal state sequence that describes the corresponding Markov process, i.e. uncover the hidden states.
  Given an observation sequence $Y_{1:T}$, and the dimensions of your model (e.g. number of hidden states and number of Gaussians), find the model $\lambda = (A, B, \pi)$, i.e. train the model to best fit the given data.

The first problem is usually solved using the so called Forward algorithm, the second problem is solved using the Viterbi algorithm and the third problem is solved using the Expectation-Maximization (EM) method. This disclosure focuses in solving the third problem listed above in order to train our models based on the EEG signals we get from the subjects, and also the first problem in order to classify the mental states of each user.

As already mentioned, an HMM is completely defined by its state transition matrix A, its observations probability model B and the initial state probability $\pi$. In our case, the sequences of observations comprised EEG signals which are continuous variables and, thus, the probability distribution of the observations B was modeled as multiple Gaussian mixtures. For each of the three tasks "Right Hand", "Left Hand" and "Rest", a separate HMM was trained. They all had the same number of members in the Gaussian mixtures and the same number of hidden states. Each HMM was fed at the beginning with sequences of feature vectors that corresponded to each of the tasks. The sequences had length 20 (which corresponded to data collected during 1 second) and were created by sliding a 20-point window on the series of feature vectors created in the previous step (data collection) point by point. The parameters of the models were estimated by using the Baum-Welch algorithm.

The number of members in the Gaussian mixtures as well as the number of hidden states for the HMM were different for each subject and a simple algorithm was created to choose them. Their choice was made by training separate models for different pairs of these variables and checking their classification accuracy on a validation set. The algorithm checked which pair (number of states, number of members in the Gaussian mixtures) provided the best accuracy. It also checked whether the relative differences between the accuracies of the three trained HMMs, as those were evaluated on the validation set, were minimal. This avoided a case in which the classification would be highly accurate for one state and have a very poor accuracy for another. The different pairs were ranked based on their average accuracy across all tasks and the average relative accuracy differences. The goal was to get the highest accuracy and the minimum relative differences. The pair that had the highest total rank was chosen for the classification procedure.

During the classification stage (control phase), a sequence of feature vectors was fed into each of the models, a log-likelihood value was computed for each of them using the Forward algorithm and the data were classified according to the maximum of these likelihood values.

EEG System Output Generation

The final output of the EEG module was a combination of the classification decision $D_k$ provided by the HMMs at each iteration k and a continuous value $Ü_k$ that represented the amount of activation—as a function of the signal power in the selected frequency band—at iteration k. A diagram of the procedure is given in FIGS. 7A and 7B.

A continuous value $v_k$ was initially calculated at each iteration k as follows:

$$v_k = (\bar{f}_{CP3,rest} - f_{CP3,k}) + (\bar{f}_{CP4,rest} - f_{CP4,k}) \quad (3)$$

where fCP3, k, fCP4, are the spectral features as extracted in Section II at channels CP3 and CP4 at iteration k as extracted in the Feature Extraction section, and fCP3,Rest, fCP4,Rest represent the mean of the spectral features over the same channels during the "Rest" task as recorded during the first phase of the experiment (data collection phase). The value $o_k$ was then passed through an exponential filter for smoothing purposes:

$$\tilde{v}_k = (1-\alpha) v_k + \alpha \tilde{v}_{k-1} \quad (4)$$

where $\alpha = 0.9418$. The value of $\alpha$ was chosen during preliminary tests based on reports from the subjects in order to achieve a smooth change on the size of the solid circle in the virtual interface. Finally, a thresholding procedure was applied to $\tilde{v}_k$ in order to ensure that any misclassification would not have any adverse effect during the control phase. This step was especially important for the control of the robotic swarm since any misclassification might be detrimental for the performance of the quadrotors which are a highly dynamical system. There were two thresholds, a high $t_H$ and a low $t_L$. They were computed as:

$$t_H = p^* [E(f_{CP3,rest}) + E(f_{CP4,Rest}) - \min(f_{CP3,LH}) - \min(f_{CP4,LH})] \quad (5)$$

$$t_L = \sqrt{\mathrm{Var}(f_{CP3,rest}) + \mathrm{Var}(f_{CP4,Rest})} \quad (6)$$

where the statistics E( ), Var( ) and min( ) refer to the activations of the data gathering phase and denote the expected value (mean), the variance and the minimum values of the data, respectively. The weighting factor p was equal to 0.85 for all of our subjects and it was chosen during preliminary tests in order to ensure that the thresholding procedure would successfully negate any misclassification commands.

The final output of the module was a real number $V_{eeg}$ that could take positive, negative or zero values depending on the thresholds and the classification decision. In more detail:

$$V_{ecg} = \begin{cases} 0 & \text{if } t_L < \tilde{v}_k < t_H \text{ OR } D_k = 0 \\ -(\tilde{v}_k - t_H) & \text{if } \tilde{v}_k > t_H \text{ AND } D_k = 1 \\ -(\tilde{v}_k - t_L) & \text{if } \tilde{v}_k < t_L \text{ AND } D_k = 2 \end{cases} \quad (7)$$

Where $D_k=0$ corresponds to the "Right Hand" task, $D_k=1$ to the "Left Hand" task and $D_k=2$ to the "Rest" task. At this point, we must specify that the "Rest" state does not correspond to a brain state where the subject does not do anything but rather to the state of volitional rest, which corresponds to the intentional focus on some other part of the body (e.g. on the nose) or on the breathing rather than on the hands as in the other tasks.

The value of $V_{eeg}$ is used to control the size of the solid circle in the virtual control interface experiment or the swarm density level in the experiment with the quadrotors. Based on the values that $V_{eeg}$ takes, it is evident that the users had to imagine moving their left hand to reduce the size of the solid circle or increase the density level of the swarm and perform volitional rest to apply the reverse operations. When the users use the joystick ($D_k=0$), the size of the solid circle or the swarm density level should not change ($V_{eeg}=0$).

One key concept here is that although the user controls a binary decision (increase/decrease of size or distance), the classification algorithm differentiates between three different states. The purpose of this approach was to explicitly recognize the use of the joystick and deal with it appropriately. In the opposite case, where the classification would be done only between the "Left Hand" and "Rest" states, the algorithm could mix the motion of the right hand due to joystick movement with that of left hand imagination and could provide false output.

EEG Output to Quadrotor Control

Figure 7A:
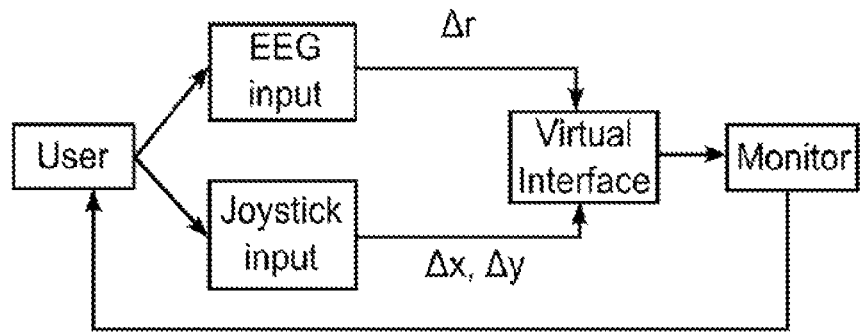
FIGS. 7A and 7B are simplified block diagrams of a virtual interface and the robotic platform interface, respectively, according to aspects of the present disclosure.
Figure 7B:
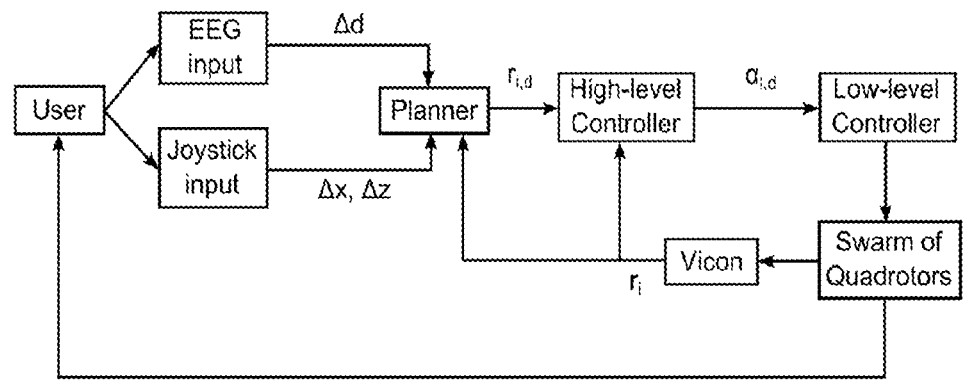

As mentioned above, during the second experiment, the user was controlling a swarm of quadrotors. These were custom built quadrotors based on an FPV 250 frame and feature the APM 2.6+ autopilot for lower level autonomous control. The onboard autopilot receives command signals from a ground station that was translating the output of the BCI system into desired roll pitch and yaw angles. The first step of this procedure involved the translation of the BCI system output into desired quadrotor positions. This was based on a planning scheme that took into account the position of the agents and the desired change in their distance and provided the new reference positions for the quadrotors. A 4-camera optical motion capture system was used for the tracking of the vehicles. The second step involved taking these desired final positions and calculating the desired roll, pitch and yaw angles and the appropriate thrust input that would move the vehicles to their destination, i.e. the high-level controller of the quadrotors. Using the desired roll, pitch and yaw angles and the desired thrust, the on-board low-level controller of the quadrotors would drive them to the desired position. A diagram that shows the interaction between the user, the BCI system and the quadrotors is given in FIG. 7B. In FIG. 7A, we provide the corresponding diagram for the first experiment (virtual interface) for completeness.

The planning scheme that transformed EEG commands to desired positions calculated a desired vector $r_d$ for each quadrotor in Cartesian space based on the following equation:

$$r_{d,i} = r_i + r_{joy} + r_{eeg} \quad (8)$$

where $i=1 \ldots n$ represents the index of each quadrotor, n is the number of quadrotors (in our case n=3), $r_{d,i}$ is the desired position of quadrotor i, $r_i$ is its current position, $r_{joy}$ represents the change in the desired position due to the joystick input and $r_{eeg}$ the corresponding change due to the EEG input. The above equation can be written in more detail as:

$$r_{d,i} = r_i + \begin{bmatrix} \Delta x_{joy} \\ 0 \\ \Delta z_{joy} \end{bmatrix} + (r_c - r_i) \begin{bmatrix} 1 \\ 1 \\ 0 \end{bmatrix} w \, \text{sign}(d_{m-1} - d_m) \quad (9)$$

where $\Delta x_{joy}$, $\Delta z_{joy}$ are the controls given by the joystick for the motion along the x- and z-axes, respectively, $r_c = 1/n \sum_i r_i$ represents the coordinates of the swarm center in 3D space, w is a weighting factor, $d_m$ represents the distance level of the swarm and sign( ) is defined as follows:

$$\text{sign}(a) = \begin{cases} 1 & \text{if } a > 0 \\ -1 & \text{if } a < 0 \\ 0 & \text{if } a = 0 \end{cases} \quad (10)$$

The change of distance level $d_{m-1}$ to $d_m$ was executed in steps. The EEG output $V_{eeg}$, was added at each iteration k to an accumulator $S_{eeg,k}$ with starting value $S_{eeg,o}$. Each time the absolute difference $|S_{eeg,k} - S_{eeg,o}|$ became equal or greater than a multiple of 0.5, the distance level changed from its previous value $d_{m-1}$ to its current one $d_m$=round($S_{eeg,k}$), where the function round( ) rounds its input to the nearest integer. This was done in order to avoid accidental change of the distance level due to misclassification from the EEG system. At the same time, it allowed the users some error which in turn relieved some of the performance pressure and helped them use the system more efficiently.

Next, the desired position $r_{d,i}$ was translated into desired roll, pitch and yaw angles ($\varphi$, $\theta$ and $\psi$ respectively) and desired thrust (T) in order to move the vehicles appropriately. This was accomplished by a Proportional Integral Derivative (PID) controller that drove the position and velocity of a quadrotor to their desired values. The control laws were based on the translational dynamics of the quadrotors shown below:

$$m \begin{bmatrix} \ddot{x} \\ \ddot{y} \\ \ddot{z} \end{bmatrix}^i = \begin{bmatrix} 0 \\ 0 \\ -mg \end{bmatrix}^i + R_b^i \begin{bmatrix} 0 \\ 0 \\ \sum_{n=1}^{4} T_n \end{bmatrix}^b \quad (11)$$

where m represents the mass of the quadrotor, $T_n$ denotes the thrust from motor n, g is the gravitational acceleration, $[\ddot{x}, \ddot{y}, \ddot{z}]^T$ are the inertial x, y and z accelerations and $R_b^i$ is the rotation matrix between the inertial frame and the body frame which is placed on the vehicle. The superscripts i and b denote quantities that are related to the inertial and the body frame, respectively. Assuming that the angles $\varphi$, $\theta$ and ψ and remain small, as has been done in other works, a PD controller was formulated which regulates the desired quadrotor attitude based on the position and the velocity. The controller can be written as:

$$\ddot{r}_d = K_p e_p + K_D e_v \quad (12)$$

where $\ddot{r}_d$ is the desired acceleration vector, $K_p$, $K_D$ are diagonal gain matrices for the proportional and derivative terms, respectively, and $e_p$, $e_p$ represent the errors in position and velocity. In this disclosure, the desired velocity is set to zero (hover) and the desired yaw angle to its initial value. Then, equation (11) can be solved for the desired attitude of the vehicle, taking into account that the controller in (12) computes the desired translational acceleration. This led to the desired roll, pitch, yaw and thrust values as follows:

$$\phi_d = \frac{1}{g}[\ddot{r}_{x,d}\cos\psi + \ddot{r}_{y,d}\sin\psi] \quad (13)$$

$$\theta_d = \frac{1}{g}[\ddot{r}_{x,d}\sin\psi - \ddot{r}_{y,d}\cos\psi] \quad (14)$$

$$\psi_d = \psi_0 \quad (15)$$

$$T_d = m(g + \ddot{r}_{z,d}) \quad (16)$$

where $\varphi_d$, $\theta_d$, $\psi_d$, T are the desired roll, pitch, yaw and thrust, respectively, ψ is the current yaw angle, $\psi_0$ is the initial yaw angle and $\ddot{r}_{x,d}$, $\ddot{r}_{y,d}$, $\ddot{r}_{z,d}$ represent the desired linear accelerations along the x, y- and z-axes, respectively. The quantities calculated in (13)-(16) were finally sent wirelessly via Bluetooth to the quadrotors which regulated their attitude based on their onboard controllers.

Results

As described above, in order to assess the efficiency of the methodology disclosed herein two types of experiments were performed. The first one involved a number of subjects controlling the size and position of a solid object in a two-dimensional virtual interface, while the second one involved one of our subjects controlling the behavior and position of a swarm of quadrotors in real time. Below are the results of each of those experiments and their meanings.

Virtual Environment Experiment

In the first experiment, the subject had to change the size of a solid circle so that it could fit inside the target circle which was always smaller, then move the solid circle inside the target circle and change its size again so that it matched that of the target. The subjects controlled the size of the solid circle using their brain activations via the model that had been trained, while the position of the cursor was controlled using a joystick.

Figure 8:
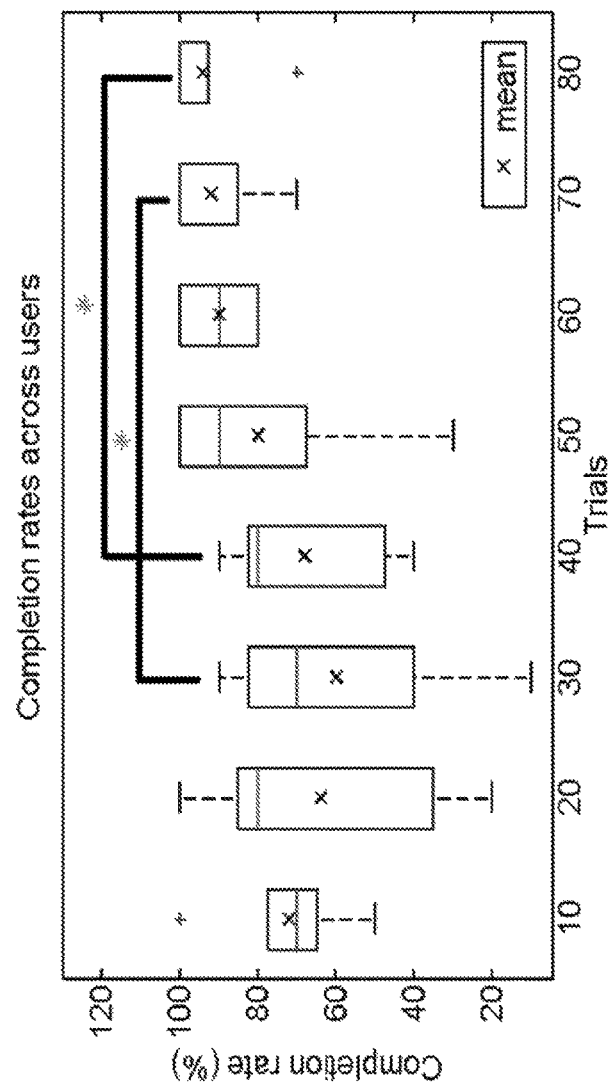
FIG. 8 is a graph showing the completion rates across all subjects, according to aspects of the present disclosure.

For the assessment of our algorithm three different metrics were used, namely completion rate, completion time and accuracy. Completion rate refers to the amount of trials that the subject was able to complete successfully, and it is presented as a percentage of completed trials across every 10 trials of the experiment. In FIG. 8, completion percentages are shown with respect to the number of trials for all subjects together in the form of box plots. The mean values for these percentages are also presented. It is shown that the completion rates increase, reaching 100% as the subjects become accustomed to the system. A left-tailed paired t-test was performed in order to show an increase in the completion rates. It is shown that the statistical significance on the 5% level between trials 21-30 and 61-70 and trials 31-40 and 71-80 (green stars), which correspond to identical trials in each session, as was described above. This proves an improvement in the completion rates from session to session as the users were getting more comfortable with the system.

Figure 9:
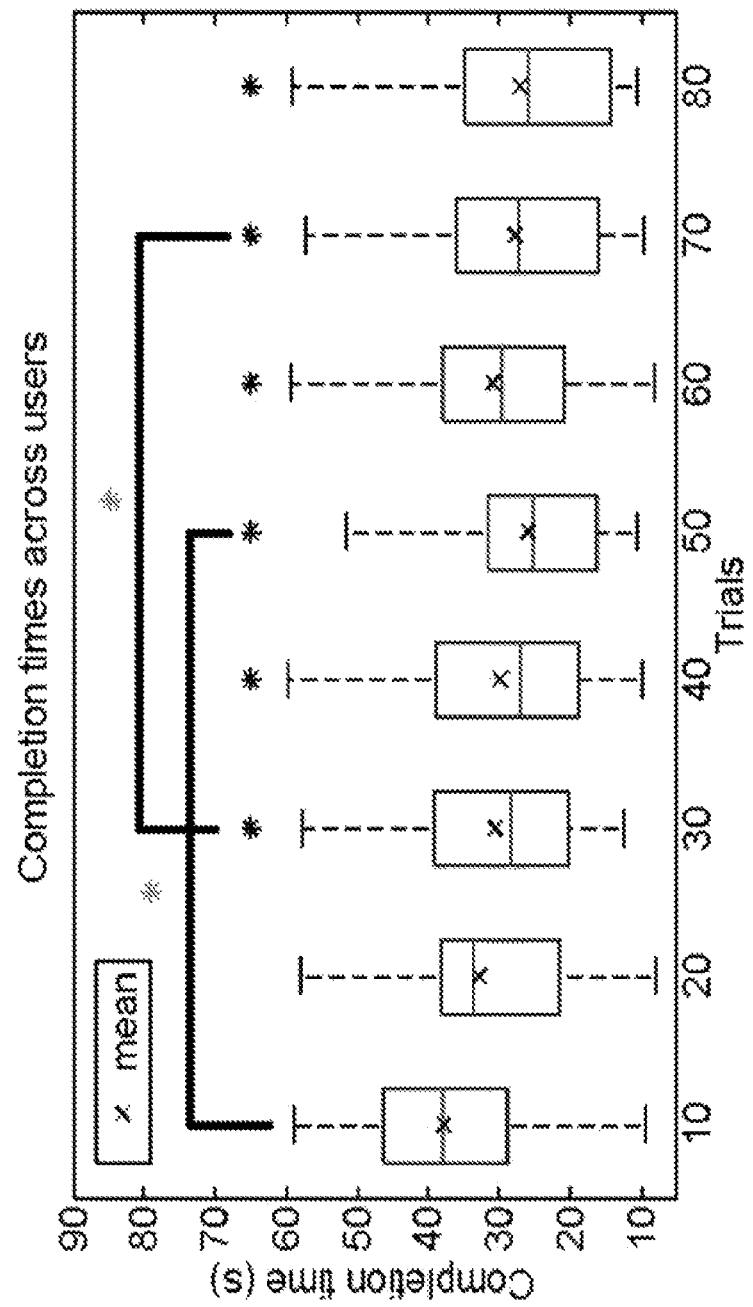
FIG. 9 is a graph showing the completion times across all subjects, according to aspects of the present disclosure.

In FIG. 9, the completion times are shown, which refer to the time it took for the users to complete the task in seconds. These are also presented in the form of box plots with their corresponding means, they are grouped in groups of 10 trials, and they refer to all subjects together. Here, only trials that the subjects were able to complete successfully are taken into account. As seen from FIG. 9, the completion times are reducing with more trials. A right-tailed paired t-test on these data was performed, in order to prove a decrease in the completion time. It is shown that such a decrease exists and it is statistically significant on the 5% level when comparing each group of 10 trials to the first one (black stars). The results were shown when comparing trials 1-10 with 41-50 and 21-30 with 61-70, as shown in FIG. 9 with green stars.

The metric of accuracy in this work is defined as the ratio of correct state transitions of the solid circle (i.e. size increase, size decrease, cursor movement) over all state transitions. The correctness of each transition is specified by the task itself (decrease size, move inside target and increase size) and the relative position of the solid circle with respect to the target. In other words, when the solid circle was outside of the target the user had to decrease its size so that it can fit. If the size was increased instead, then that state transition was considered wrong and the accuracy rate was negatively affected. The opposite applied for when the solid circle was inside the target and the user had to increase its size. In the case of solid circle movement, we were interested in checking if the system correctly identified the joystick motion (i.e. use of the right hand). We chose to study the accuracy rate of our system and not the misclassification rate for two reasons. The first one was to incorporate in one metric the performances of both the algorithm and that of the subjects. The second one related to the fact that the subjects were free to complete the task in a self-paced way and it was never specified to them which brain state to be in and, thus, it would not be appropriate to consider misclassification rates.

Figure 10:
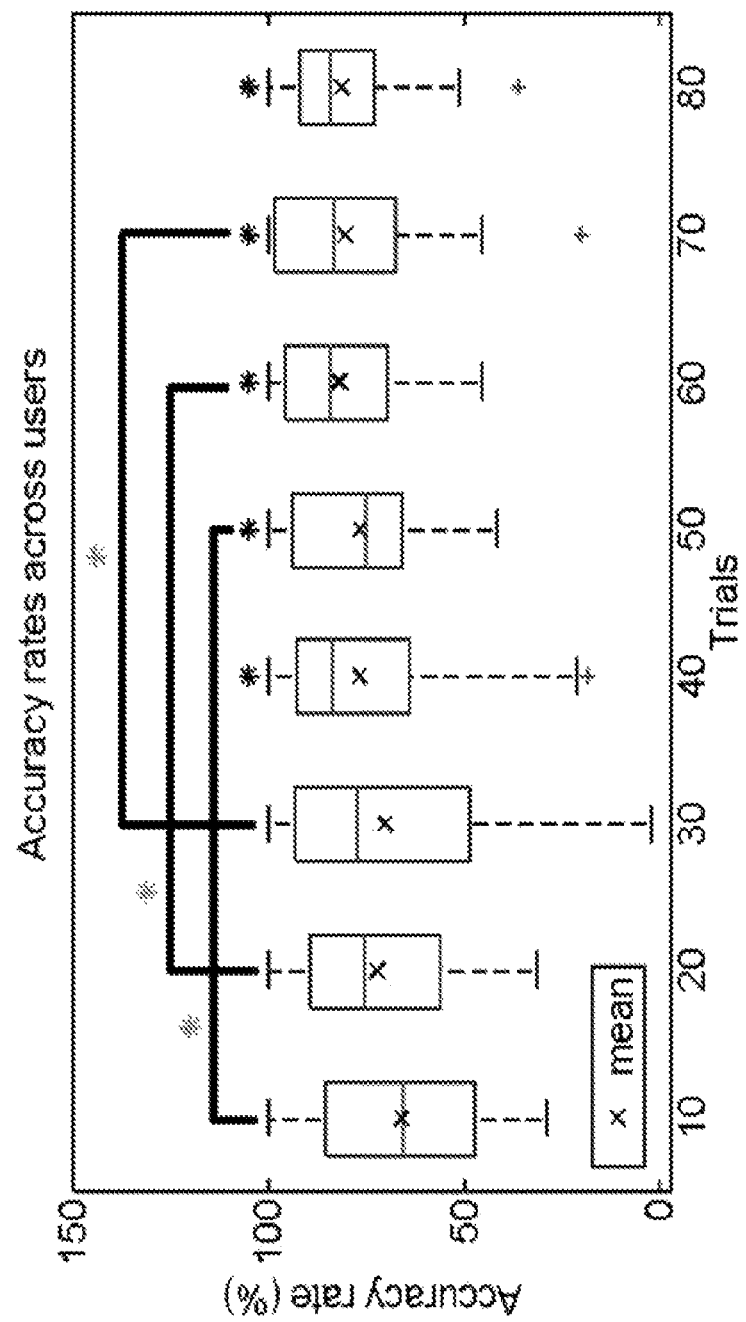
FIG. 10 is a graph showing the accuracy rates across all subjects and all tasks, according to aspects of the present disclosure.
Figure 11:
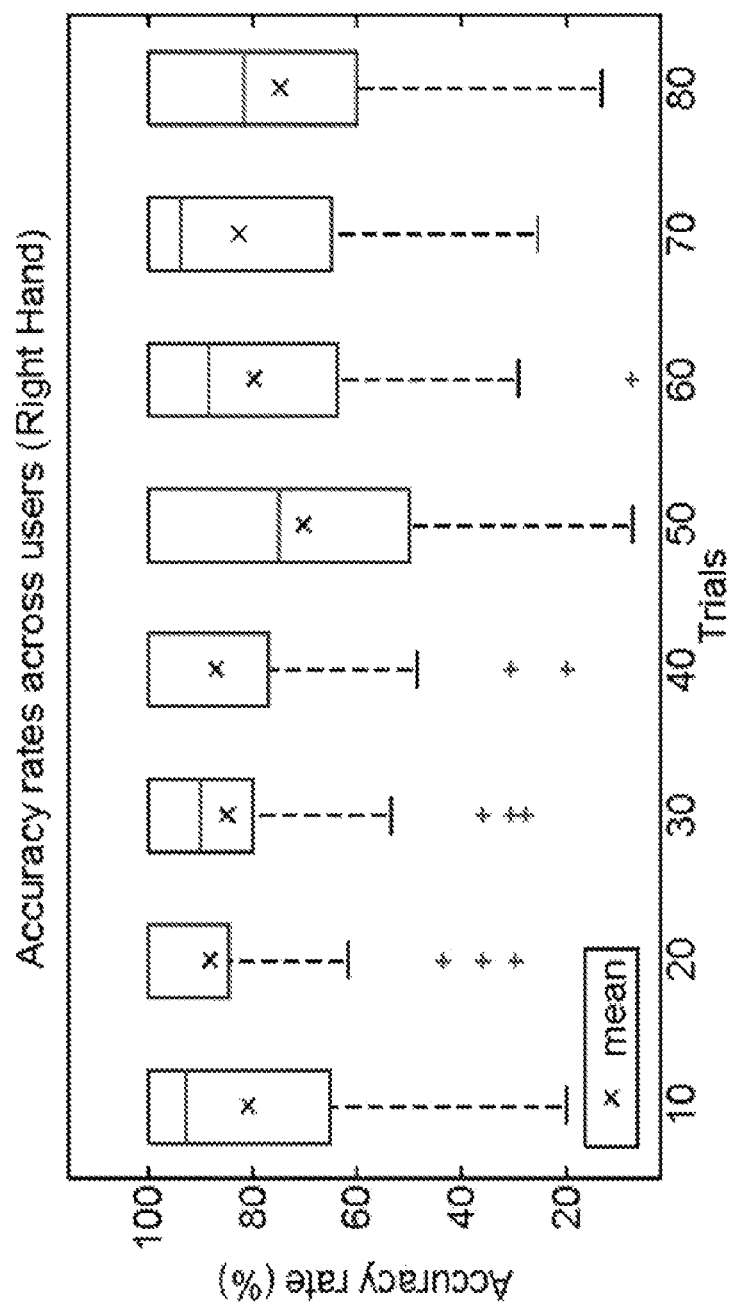
FIG. 11 is a graph showing the accuracy rates across all subjects for the "right hand" task, according to aspects of the present disclosure.
Figure 12:
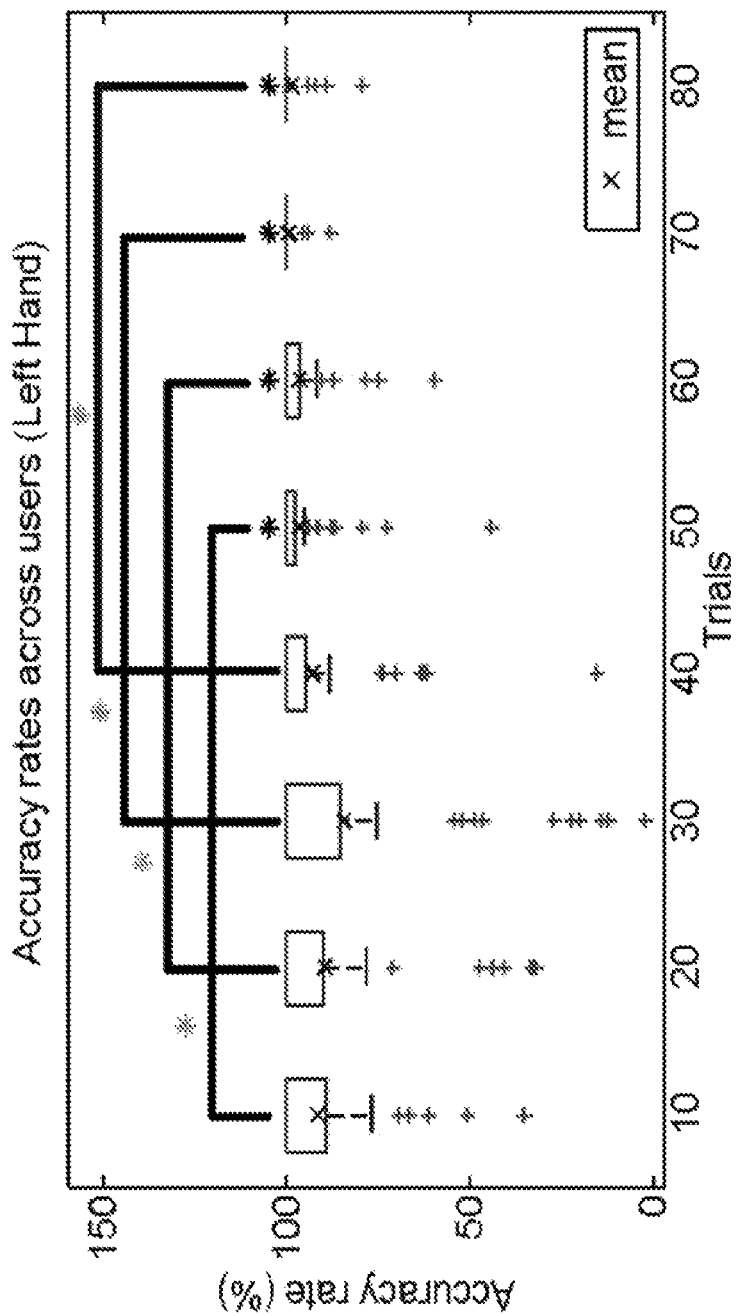
FIG. 12 is a graph showing the accuracy rates across all subjects for the "left hand" task, according to aspects of the present disclosure.
Figure 13:
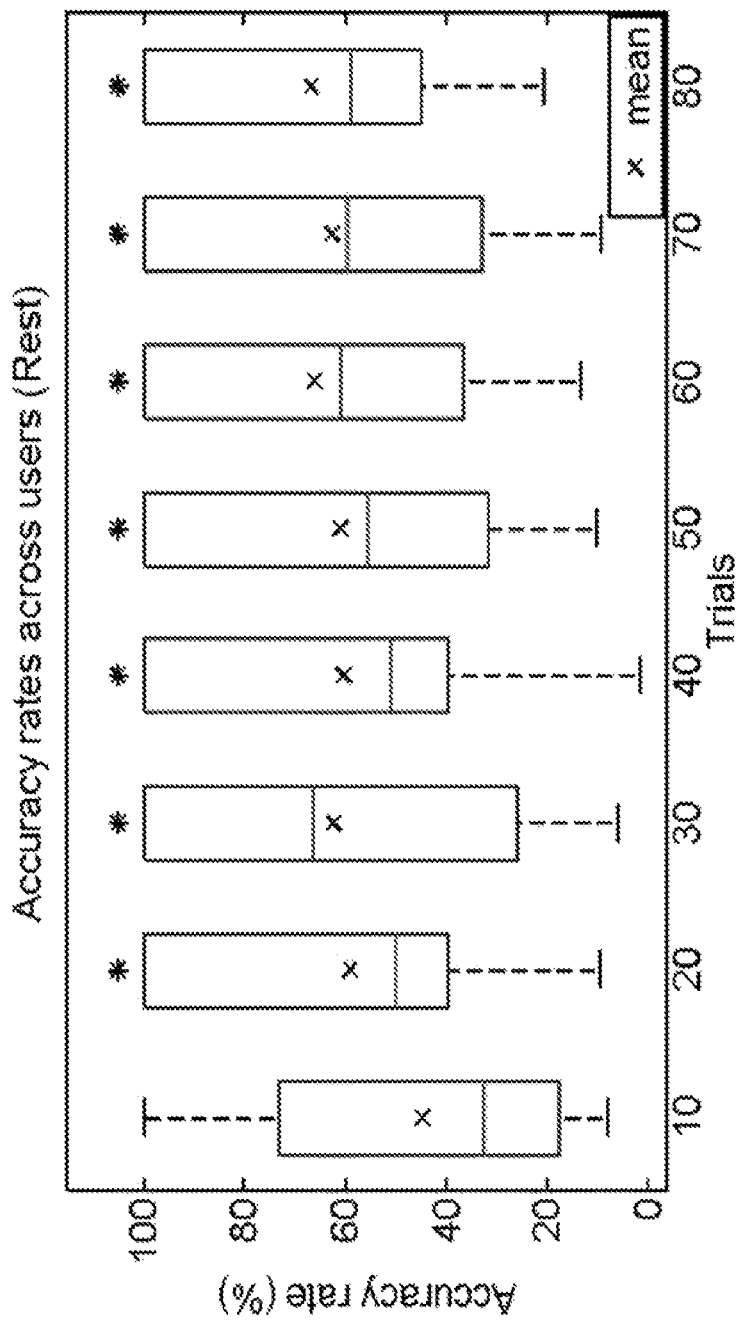
FIG. 13 is a graph showing the accuracy rates across all subjects for the "rest task", according to aspects of the present disclosure.

The results for the accuracy levels are presented in FIG. 10. We present the overall accuracy rates of the task at hand and the corresponding accuracy rates for each brain state separately (FIGS. 11-13). The overall accuracy over all trials is above 60% on average. At the same time, an increase in the accuracy rates was shown as the subjects interact more with the system. The difference between trials 31-80 is significant on the 5% level. For these data, a left-tailed paired t-test was performed in order to prove increase in the accuracy. It was further shown that there is a significant increase on the 5% level when comparing the first 30 trials of session 1 and the first 30 of session 2 (trials 41-70). These observations indicate that the accuracy level increases with time as the four subjects use the system and also from one session to the next.

Finally, for the accuracy rates of the individual brain states, a left-tailed paired t-test was performed on the 5% significance level (as was done for the overall accuracy rates) and we conclude to the following observations. First, it is shown that there is no statistical difference across the trials that correspond to the "Right Hand" task (FIG. 11). This is expected since moving the joystick does not require any thought process from the users and they do not have to modulate explicitly any type of brain signals to perform that task. Thus, no training is involved and the activations should not change. On the other hand, we show statistical differences for both the "Left Hand" and the "Rest" task.

Based on the results presented so far, it can be safely postulated that the system can be used successfully by multiple users while achieving high performance and accuracy rates with minimum training (the entire control phase lasted on average less than an hour). It is important to note that the accuracy rates for most users at the very beginning of the experiment (first 10 trials) are still high enough to permit the completion of the task several times. It is worth mentioning again that the users were free to complete the tasks in any way they wanted, which means that they were able to combine brain signal control and joystick control seamlessly, at their own pace and without any reported difficulty.

Common Principal Components

Figure 14:
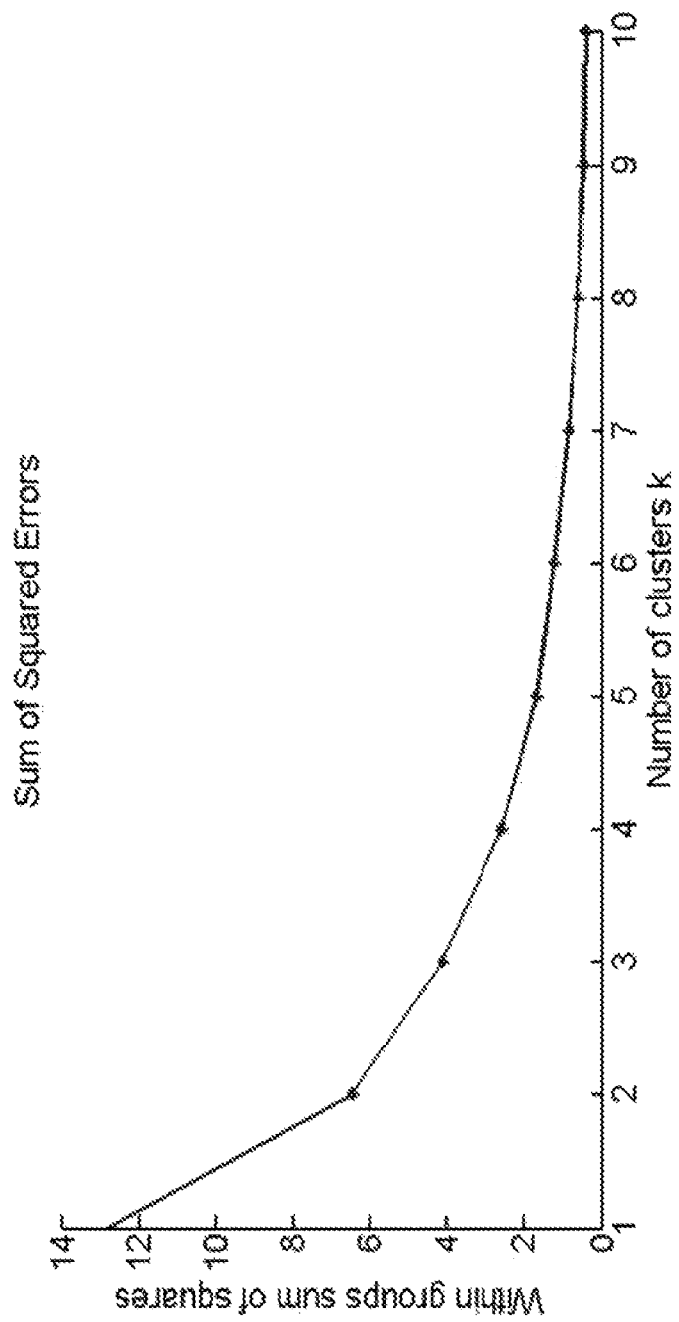
FIG. 14 is a graph showing the sum of squared errors versus the number of clusters k, according to aspects of the present disclosure.
Figure 15:
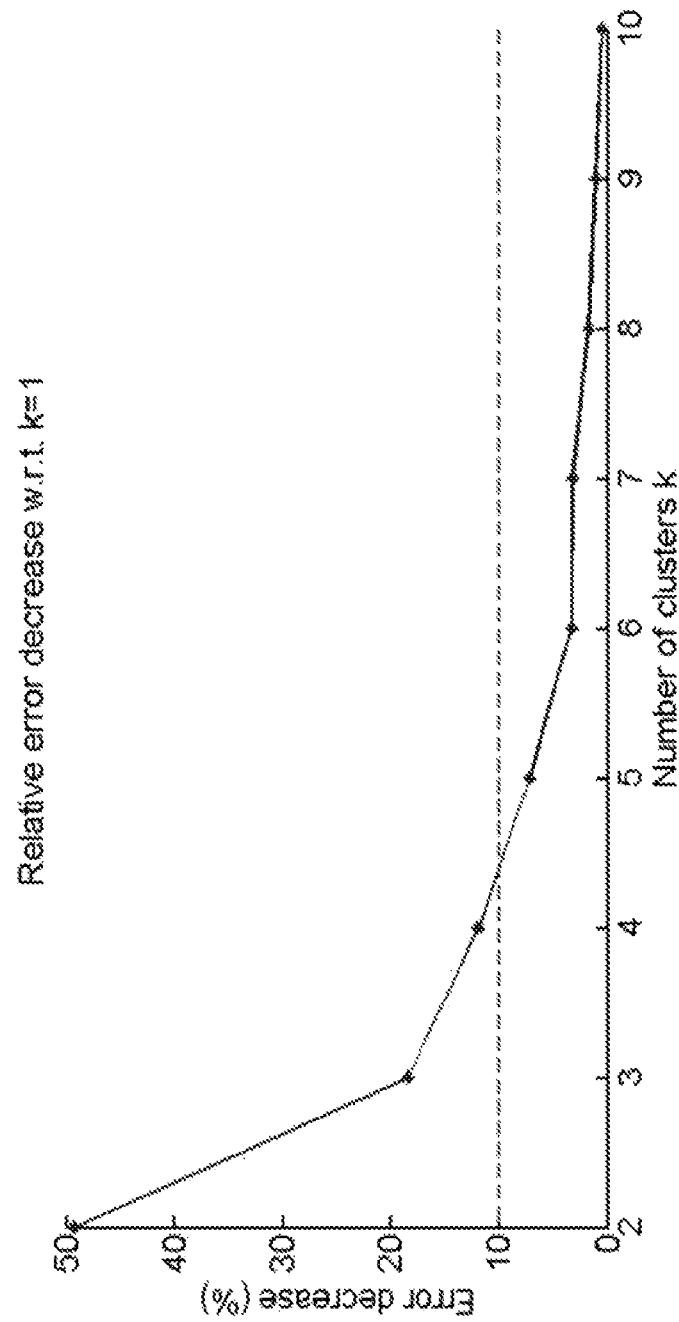
FIG. 15 is a graph showing the relative sum of squared errors decrease against the number of clusters k, according to aspects of the present disclosure.

In Table I, the number of parameters is presented that the training algorithm extracted for each subject. As it can be seen, the model order for each subject is different, which is to be expected due to intra-subject variability. In order to demonstrate the generalization characteristics of the disclosed method, the disclosure focuses on the Principal Components (PCs) which explained the variance of the spectral features across the different brain states of the subjects. The goal was to find PCs that were similar across subjects. In order to do so, all the PCs that were chosen were grouped for the subjects using the method of k-means clustering. Since the number of clusters k is not a-priori defined for the dataset, its value was chosen based on the following procedure. Clustering was first performed for different values of k. In each case, the Sum of Squared Errors (SSE) was calculated between all data points and the centers of the clusters that they belonged to as follows:

$$SSE = \sum_{i=1}^{k} \sum_{x \in c_i} dist(x, c_i)^2 \qquad (17)$$

where x is the cluster member, $c_i$ represents the cluster centroid and dist( ) represents the Euclidean distance between x and $c_i$ (FIG. 14). Then, for each k, the relative difference between $SSE_k$ and $SSE_{k+1}$ is calculated with respect to the SSE for k=1 as:

$$\Delta SSE_k = \frac{SSE_{k+1} - SSE_k}{SSE_1} \qquad (18)$$

where $SSE_k$, $SSE_{k+1}$ represent the value of SSE for k and k+1, respectively, while $SSE_1$ is the SSE for k=1. The value of $\Delta SSE_k$ represents the relative decrease in error with respect to the error for k=1 as the number of clusters are increased by one. The goal was to choose the minimum number of clusters, while also having minimum clustering error. We chose the minimum value of k was chosen for which $\Delta SSE_k < 10\%$. According to FIG. 15, this value corresponded to k=5.

As an additional measure to choose the best clusters and to avoid any outliers, we applied the method of silhouettes. The silhouette is a measure that is used in clustering analysis and it represents how similar a member is to its own cluster relative to the other clusters. It takes values in the range of [−1, 1] with 1 representing perfect fit and −1 the opposite. From the four clusters produced by the k-means clustering method, those clusters were chosen that had an average silhouette value s≥0.3. As a final step, in each cluster, if there were more principal components for the same subject, the one that was closer to the cluster center was chosen.

Figure 16:
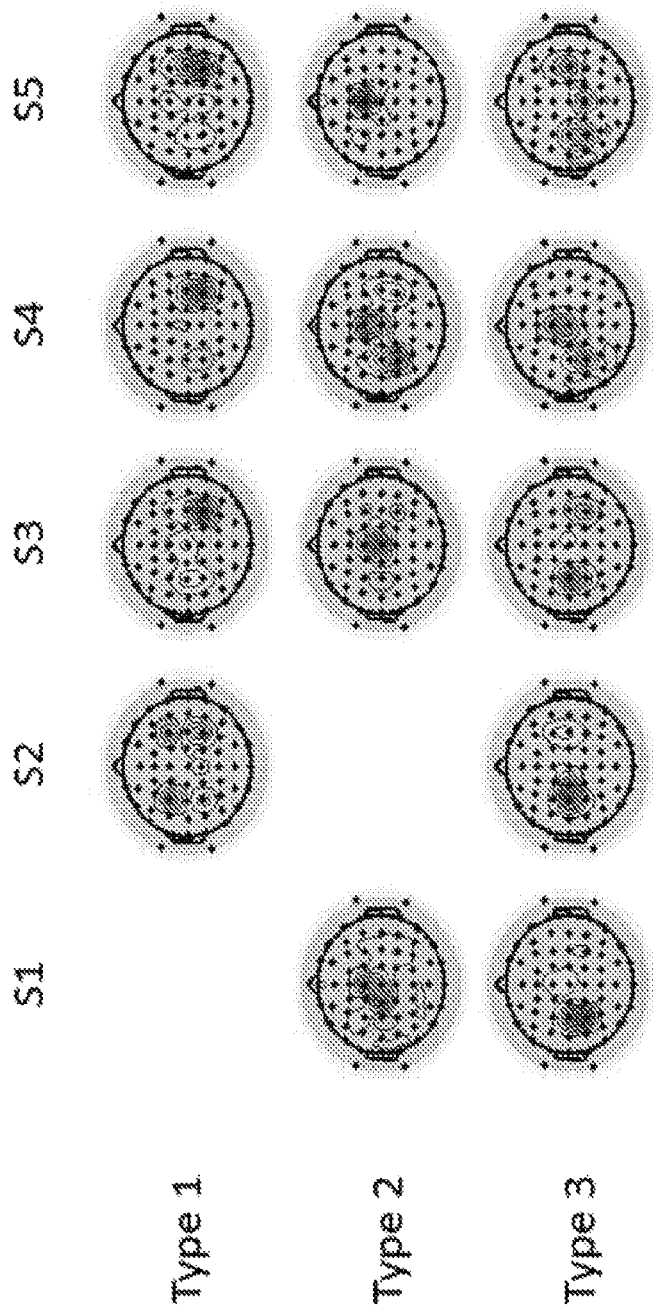
FIG. 16 is a simplified illustration showing the common principal components across subjects, according to aspects of the present disclosure.

The results of this analysis are presented in FIG. 16 and they are organized according to their type and the subject they belong to. The brain maps shown in this figure are created by interpolating the values of the PC weights that correspond to the 11 channels that were focused on the analysis discussed above considering all other channels as having a weight of zero. It was shown that three different types of PCs with two (Type 1 and 2) being similar across four out of the five subjects and one (Type 3) being similar across all of our subjects. That indicates that there is a strong correlation between the underlying brain states used for the control phase and the particular channels that have the biggest weights in those components. It also proves that the BCI methodology followed in this work can be greatly generalized without changes across multiple users.

Control of a Swarm of Quadrotors

In the second experiment, the subject that was able to achieve the highest average accuracy across all trials was chosen in order to control a swarm of three quadrotors using the proposed hybrid BCI system. The experimental procedure was the same as for the experiment with the virtual environment and it had the same phases, namely the data collection phase, the training phase and the control phase. The task in the control phase was to pass the quadrotors through a rectangular hoop. The subject had to bring the vehicles closer to the hoop, change the distance between them (i.e. change the swarm density) so that they can fit through the hoop using his brain signals, move them through the hoop using the joystick and finally return them to their original distances using brain activations again, as explained in the block diagram in FIG. 7B.

Figure 17:
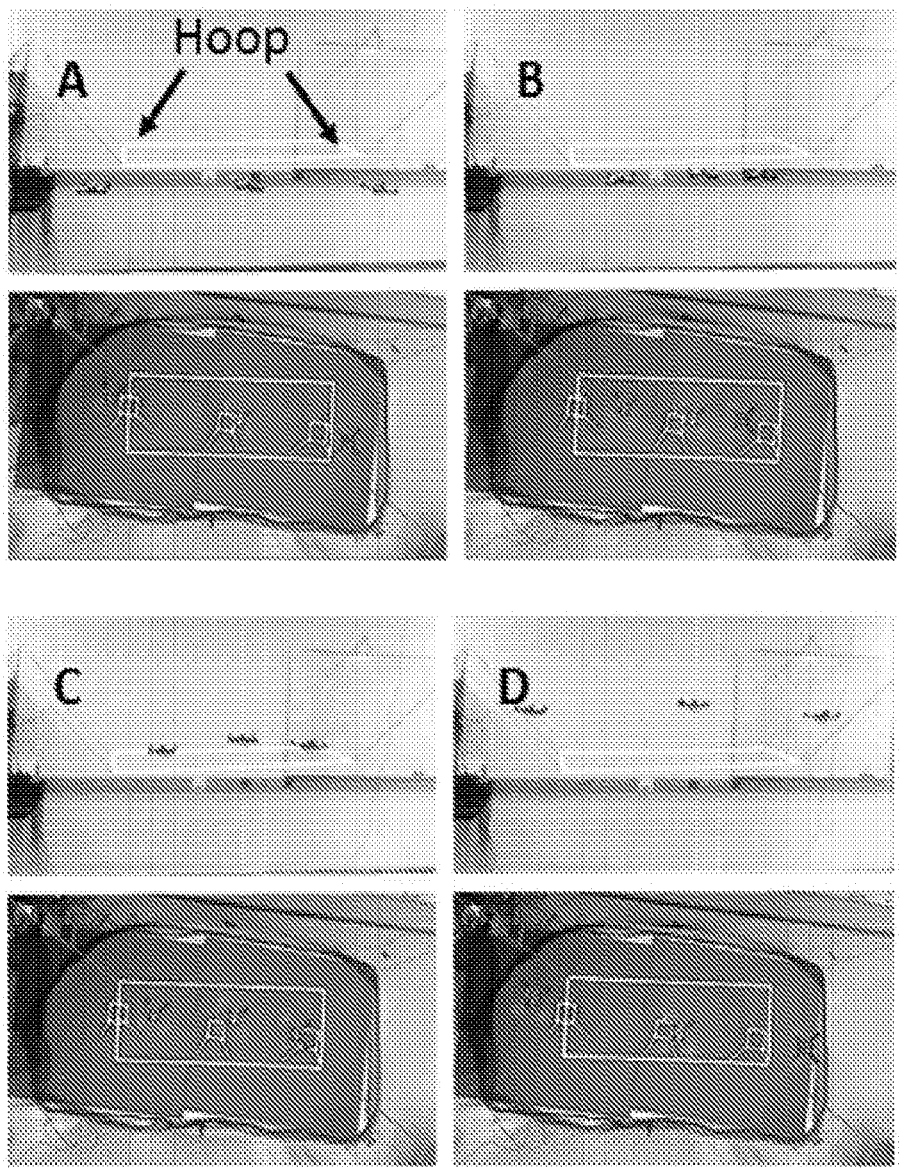
FIG. 17 are snapshots of the three quadrotors passing through a rectangular hoop during the second experiment, according to aspects of the present disclosure.
Figure 18:
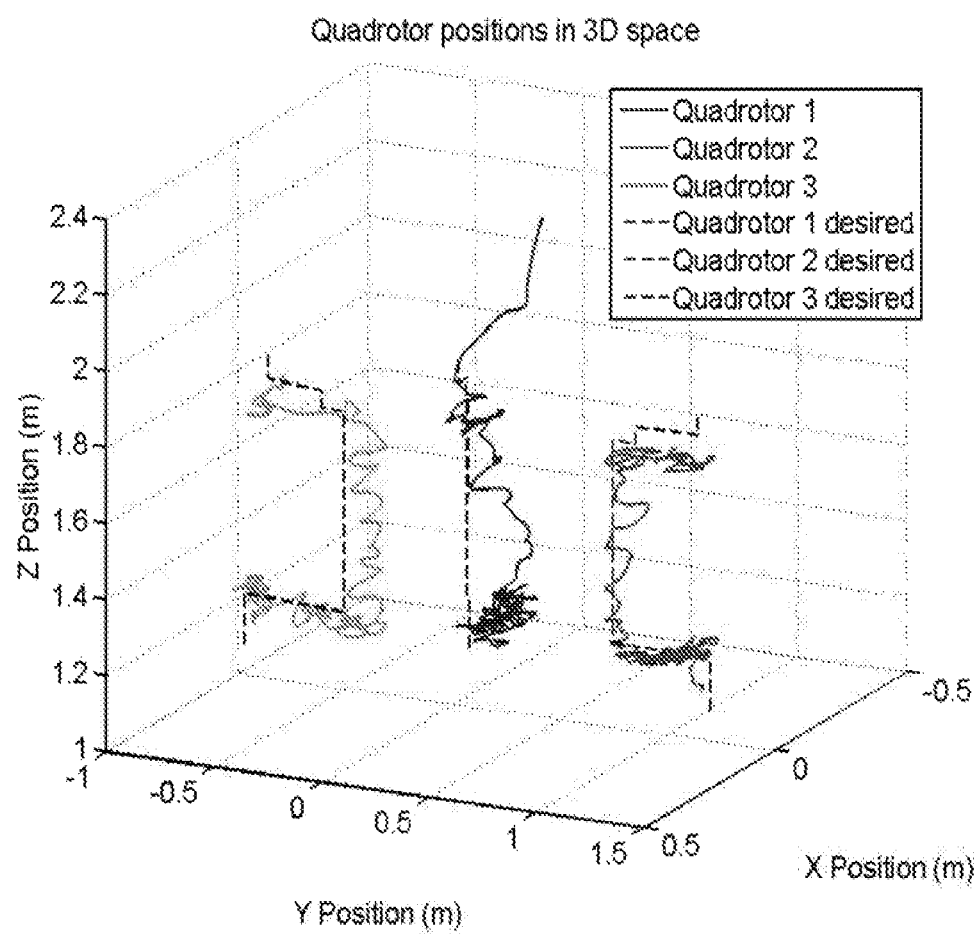
FIG. 18 is a graph showing the position of the three quadrotors in 3D-space during the a second experiment, according to aspects of the present disclosure.
Figure 19:
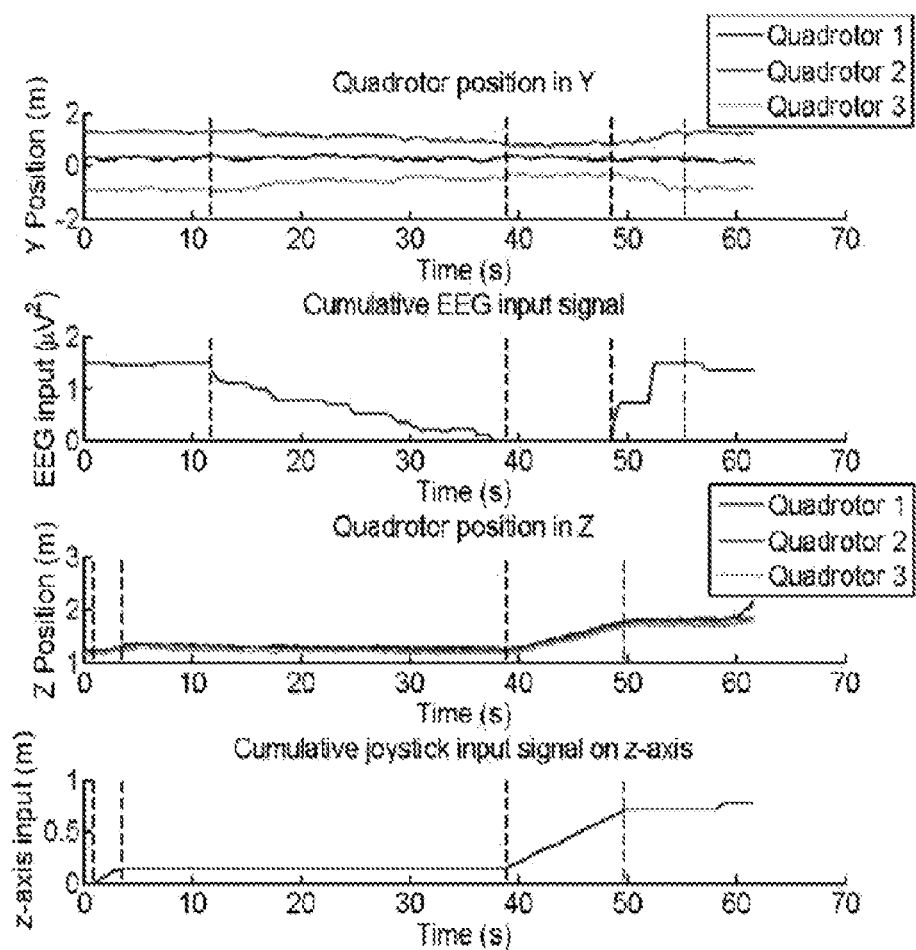
FIG. 19 are graphs showing the position of the three quadrotors and EEG and joystick input during the second experiment versus time, according to aspects of the present disclosure.

In FIG. 17 we show snapshots of the experiment, where the user changes the formation of the quadrotors, passes them through the hoop and then returns them in their original formation. In FIG. 18, we show their 3D position during the experiment, while in FIG. 19 we show the relative motion of the vehicles against the input from the EEG system and the joystick. In more detail, the second subplot from the top shows the change in the distance level of the quads in a cumulative way as the user produces the appropriate commands. The bottom subplot shows the cumulative input that was produced by the joystick in the z direction. It should be mentioned that the change in swarm density resulted in change of the quadrotor positions along the y-axis (top subplot), while the joystick output moved them across the z-axis (third subplot from top). In FIG. 19, it is also shown that the phases of the experiment with vertical black dashed lines.

As it can be seen in the figures, the subject was able to change the control input seamlessly from joystick to EEG signals and back with minimum error and without the vehicles changing their relative distance while passing through the hoop. This was a real-time demonstration of controlling a swarm of quadrotors using our proposed hybrid BCI using both EEG activations and joystick inputs.

The hybrid EEG system disclosed herein is described primarily for the case where the users are either providing a joystick input by moving their right hand (left if they are left-handed) or an EEG input based on their brain signals and their intent. In this scenario, the users use these two different inputs at different time instants in order to control an external device or a robotic platform, such as a swarm of robots. In addition to that functionality, the users can also provide simultaneous inputs to the platform using the EEG system and the joystick at the same time instant. This can happen in two ways.

The simplest one is by pushing and holding the joystick towards a specific direction and performing limb motion imagination as usual. In this case, the system will process the joystick input without classifying it as a "Right Hand" task (the users do not move their hand except at the very beginning but the joystick input is still sent as a signal), while the limb motion imagination will be recognized appropriately. In the other case, there is an additional task that needs to be accounted for during the data collection and the model training phases. This task involves both hands ("Both hands" task), where one is used for performing limb movement imagination and the other is used to move the joystick. In this case, the intent of the user will be classified between more than three tasks ("Right Hand", "Left Hand", "Both Hands", "Rest") to accommodate for the parallel use of joystick and EEG input. Since the additional model can be trained separately from the other models, it can be added later during the use of the system with minimum changes to the code and without performing the entire data collection and model training procedures from the beginning, thus providing greater flexibility and adaptability to the user.

Results related to the last methodology during preliminary trials of the system show good performance and accuracy, while no problems were reported by the users. Possible misclassifications may occur between the "Right Hand" and "Both Hands" tasks (depending on the user) but appropriate procedures, such as thresholding of the EEG output value almost eliminate these errors, thus maintaining good performance of the system.

Figure 20:
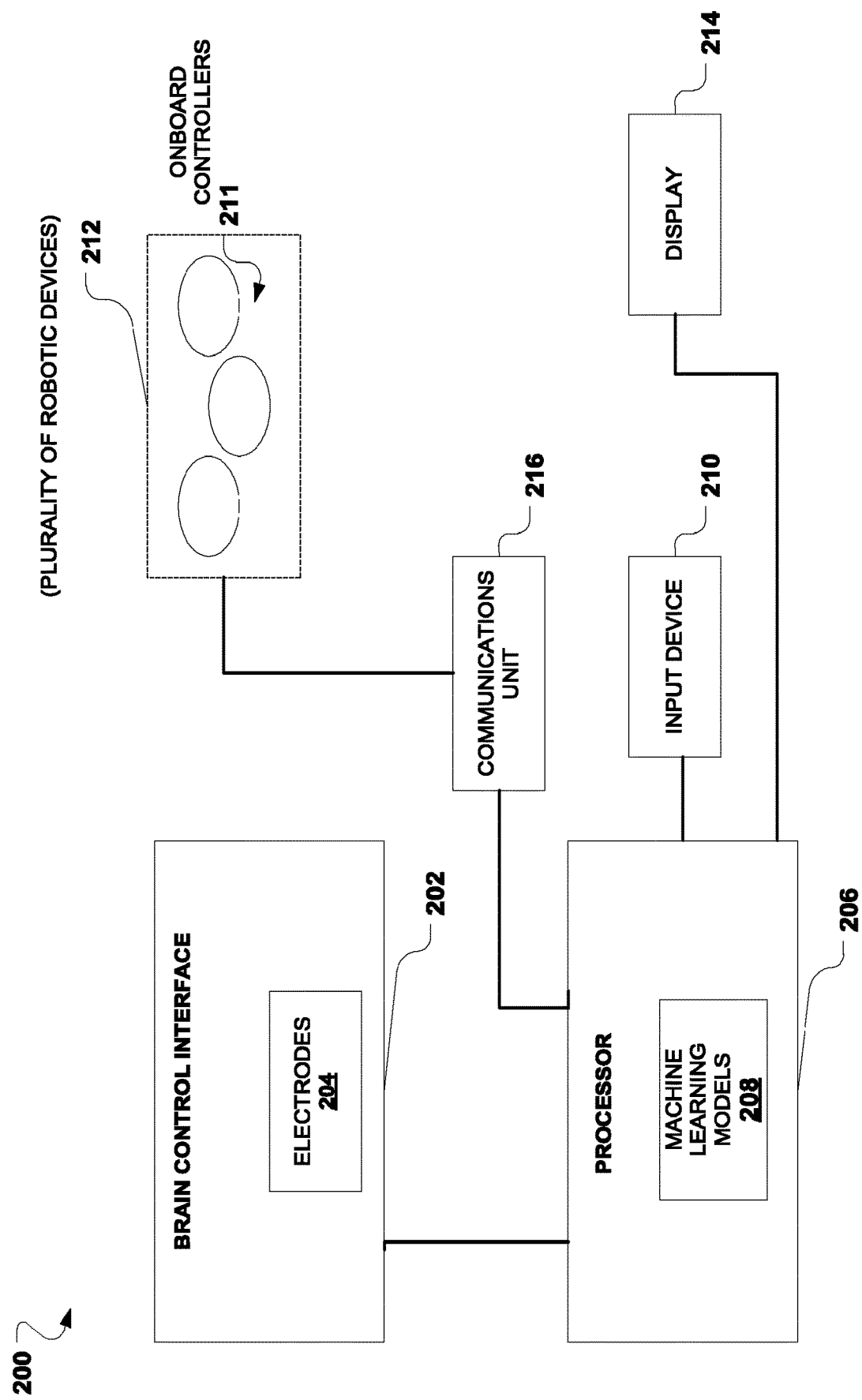
FIG. 20 is a simplified block diagram of the system, according to aspects of the present disclosure.

Referring to FIG. 20, a system 200 is shown for further describing aspects of the present disclosure. The system 200 includes a brain control interface (BCI) 202, which may further include a plurality of electrodes 204 for accessing brain signals of a user. As shown, the BCI 202 may be electronically coupled, may include, or otherwise be in communication with a processor 206. The processor 206 executes, trains, or otherwise interacts with one or more machine learning models 208 or functions described herein. Brain signal information is generated by the BCI 202, decoded by the processor 206, and such information is applied to the machine learning models 208 to identify one or more brain states when a user is subjected to testing or an exercise while engaged to the BCI 202. As described herein, information about brain signals accessed from the BCI 202 may be decoded by the processor 206 during a testing phase to generate test data, and information about brain signals accessed from the BCI 202 may be decoded by the processor 206 during a control phase to generate control data. The processor 206 is further implemented to train one or more of the machine learning models 208 to classify brain states from the control data using Hidden Markov Models and Principal Component Analysis, as described herein.

During a control phase, the processor 206 applies control data, as accessed from the BCI 202, to the machine learning models 208 and/or other functions to identify a brain state of the user in real time. In some embodiments, brain states may correlate to a user's desired movement of the plurality of robotic devices 212 individually; e.g., movement relative to one another. In some embodiments, the brain state (or brain states) may indicate a desired density of the plurality of robotic devices 212. For example, the density of the plurality of the robotic devices 212 may define a desired distance between each of the plurality of robotic devices 212, the quantity of one or more of the plurality of robotic devices 212 in a given area or space, or otherwise. In some embodiments, the plurality of robotic devices 212 may include rotorcraft such as quadrotors, such that a desired density associated with the plurality of robotic devices 212 may define a density of a swarm of the plurality of robotic devices 212, e.g., relative proximity to one another. Increasing the density of the plurality of robotic devices 212 may allow the plurality of robotic devices 212 to maneuver through e.g. a hoop or other obstacle as described herein. In other embodiments, the brain states may correlate to other degrees of freedom such as the movement of the plurality of robotic devices 212 along a vertical axis, horizontal axis, or otherwise.

The control data may be translated by the processor 206 to a command or set of instructions which may be transmitted (via Bluetooth, WiFi, or other form of radio) to onboard controllers 211 associated with one or more of a plurality of robotic devices 212 using a communications unit 216 (e.g. modem, command station, or the like) in communication with the processor 206. So, for example, where the plurality of robotic devices 212 includes rotorcraft, the instructions may include parameters suitable to adjust a rotational frequency of a motor associated with one or more of such rotorcraft to accommodate desired roll, pitch and yaw angles and appropriate thrust input that moves the plurality of robotic devices 212 relative to one another to achieve the desired density. As such, the brain states accessed from the BCI 202 by the processor 206 may be used to drive specific, user-intended motion or movement of the plurality of robotic devices 212.

In addition, in some embodiments, the system 200 may include an input device 210 in communication with the processor 206 for generating input data associated with a desired position of the plurality of robotic devices 212, collectively. The input device 210 may include a joystick, mouse, or other such device that a user may engage to indicate a desired movement of the plurality of robotic devices 212, collectively as a unit, to a particular position. In some embodiments, while this collective movement may comprise a change in a position of one or more of the plurality of robotic devices 112, the distances between the devices respectively, may remain constant such that the plurality of robotic devices 212 may move as a collective unit fixed in a predetermined orientation relative to one another.

The input data may be translated by the processor 206 to a command or set of instructions which may be transmitted (via Bluetooth, WiFi, or other form of radio) to the onboard controllers 211 associated with one or more of a plurality of the robotic devices 212 using the communications unit 216. So, for example, where the plurality of robotic devices 212 includes rotorcraft, the instructions may include parameters suitable to adjust a rotational frequency of a motor associated with one or more of such rotorcraft to accommodate desired roll, pitch and yaw angles and appropriate thrust input that moves the plurality of robotic devices 212 collectively to a desired position. As such, the input data accessed from the input device 210 may also be used to drive motion or movement of the plurality of robotic devices 212.

In some embodiments, the processor 206 combines the control data with the input data to control the plurality of robotic devices 212 in real-time to create a hybrid BCI. In some embodiments, the system 200 may further include a display 214 so that a user or may view graphical information about the testing or control phase of the BCI 202.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A method, comprising:
utilizing a processor in communication with a tangible storage medium storing instructions that are executed by the processor to perform operations comprising:
accessing data associated with a plurality of test Electroencephalographic (EEG) signals, and
training a machine learning model to identify a brain state associated with a predetermined signal of the plurality of test EEG signals using the data;
providing an interface in communication with the processor, the interface configured to access a plurality of control EEG signals;
providing an input device in communication with the processor for generating input data associated with a desired position, the desired position associated with a plurality of robotic devices;
translating the input data to a first command configured to move the plurality of robotic devices collectively to the desired position;
translating a control signal of the plurality of control EEG signals to control data;
applying the control data to the machine learning model to identify the brain state; and
generating a second command configured to adjust a density associated with the plurality of robotic devices based on the brain state.

2. The method of claim 1, further comprising:
transmitting the first command to onboard controllers associated with the plurality of robotic devices,
wherein the first command results in a collective movement of the plurality of robotic devices to the desired position such that relative distances between each of the plurality of robotics devices remains constant.

3. The method of claim 1, further comprising:
transmitting the first command and the second command to onboard controllers associated with the plurality of robotic devices,
wherein the first command and the second command define parameters for desired roll, pitch, and yaw angles associated with the plurality of robotic devices to accommodate the desired position and the density, the density defining a proximity of each of the plurality of robotic devices relative to each other.

4. The method of claim 1, further comprising:
utilizing the processor, to:
control the desired position of the plurality of robotic devices and the density of the plurality of robotic devices using simultaneous inputs accessed from the input device and the interface.

5. The method of claim 1, wherein the data associated with the plurality of test EEG signals is derived from a plurality of channels of interest arranged along a sensorimotor cortex.

6. The method of claim 1, further comprising extracting a set of features from the data associated with the plurality of test EEG signals.

7. The method of claim 6, further comprising extracting the set of features by:
applying a Hanning window to the data; and
applying a Fast Fourier Transform (FFT) to the data to generate a set of spectral features.

8. The method of claim 7, further comprising:
applying Principal Component Analysis (PCA) to the set of spectral features.

9. The method of claim 8, further comprising:
classifying a plurality of brain states that includes the brain state, by utilizing Hidden Markov Models (HMMs) in combination with PCA to distinguish descriptive features from other features of the set of features.

10. The method of claim 9, further comprising:
exploiting an Event Related Desynchronization/Synchronization (ERD/ERS) phenomena during a limb movement imagination by combining the PCA with the HMMs.

11. A device, comprising:
a control interface, the control interface defining a plurality of electrodes configured for accessing a plurality of brain signals associated with a plurality of channels located over a sensorimotor cortex;
a processor in operative communication with the control interface, the processor configured to:
train a machine learning model to associate a brain state with data defining a brain signal,
decode a control signal of the plurality of brain signals to generate control data,
apply the control data to the machine learning model to identify the brain state, and
transmit instructions to a plurality of robotic devices to modify a density of the plurality of robotic devices based on the brain state; and
an input device in operable communication with the processor for generating input data, the input data utilized by the processor to modify a position of the plurality of robotic devices.

12. The device of claim 11, wherein the processor is configured to detect a frequency where (ERD/ERS) phenomena exceeds a predefined threshold value.

13. The device of claim 11, wherein the plurality of channels includes C3, Cz, C4, FC3, CP3, C1, FCz, CPz, C2, FC4, and CP4.

14. The device of claim 11, wherein a thresholding procedure is applied by the processor to reduce a probability of misclassification during a control phase.

15. The device of claim 11, wherein the plurality of robotic devices each comprise a rotorcraft and the processor translates data associated with brain states and the input data to desired changes in positions of the rotorcraft.

16. A device, comprising:
an interface configured for accessing a brain signal;
a processor in communication with the interface, the processor configured to decode the brain signal to control data defining a known brain state, the processor further configured to control a first movement associated with a plurality of robotic devices using the control data associated with the known brain state; and
an input device in operable communication with the processor for generating input data interpretable by the processor to control a second movement associated with the plurality of robotic devices,
wherein the first movement comprises a movement of one or more of the plurality of robotic devices to adjust a density associated with the plurality of robotic devices.

17. The device of claim 16, wherein the second movement comprises a shift in position of the plurality of robotic devices collectively.

18. The device of claim 16, wherein the processor is configured to train a machine learning model to classify brain states from the control data using Hidden Markov Models and Principal Component Analysis, the brain states associated with intended movement of one or more of the plurality of robotic devices.

19. The device of claim 16, wherein the processor combines the control data with the input data to control the plurality of robotic devices in real-time and increase an amount of degrees of freedom associated with a user.

* * * * *